United States Patent
Ou et al.

(10) Patent No.: US 10,890,949 B2
(45) Date of Patent: Jan. 12, 2021

(54) HINGE MECHANISM BY GEAR SET WITH SLIDER FOR FOLDABLE DISPLAY DEVICE

(71) Applicant: Google LLC, Mountain View, CA (US)

(72) Inventors: Davis Ou, New Taipei (TW); Mike Liu, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/159,154

(22) Filed: Oct. 12, 2018

(65) Prior Publication Data

US 2020/0117245 A1 Apr. 16, 2020

(51) Int. Cl.
*G06F 1/16* (2006.01)
*H04M 1/02* (2006.01)

(52) U.S. Cl.
CPC .......... *G06F 1/1681* (2013.01); *G06F 1/1616* (2013.01); *G06F 1/1652* (2013.01); *H04M 1/0216* (2013.01)

(58) Field of Classification Search
CPC .... G06F 1/1616; G06F 1/1618; G06F 1/1652; G06F 1/1681; G06F 1/1624; H04M 1/0216; H04M 1/0268; H04M 1/0237
See application file for complete search history.

(56) References Cited

U.S. PATENT DOCUMENTS

| | | | | |
|---|---|---|---|---|
| 8,713,757 B2* | 5/2014 | Chen | ..................... | G06F 1/1616 16/327 |
| 9,064,431 B2 | 6/2015 | Ahn et al. | | |
| 9,874,048 B1* | 1/2018 | Hsu | ......................... | G09F 9/301 |
| 2015/0361696 A1* | 12/2015 | Tazbaz | .................. | G06F 1/1681 361/679.27 |
| 2016/0070303 A1* | 3/2016 | Lee | ....................... | G06F 1/1652 361/679.27 |
| 2018/0011515 A1* | 1/2018 | Yoo | ....................... | G06F 1/1626 |

FOREIGN PATENT DOCUMENTS

EP 2993551 A1 3/2016

OTHER PUBLICATIONS

International Search Report and Written Opinion for Application No. PCT/US2019/055383, dated Jan. 9, 2020, 17 pages.

* cited by examiner

*Primary Examiner* — Rockshana D Chowdhury
(74) *Attorney, Agent, or Firm* — Brake Hughes Bellermann LLP

(57) ABSTRACT

In a general aspect, a foldable display device may include processor, a memory, a first housing having a first end portion and a second end portion, a first length extending between the first end portion and the second end portion of the first housing, a second housing having a first end portion and a second end portion, a second length extending between the first end portion and the second end portion of the second housing, the second length being different than the first length, a flexible display disposed on the first housing and the second housing, and a hinge assembly disposed between the first housing and the second housing to rotate the first housing and the second toward each other. The hinge assembly may include a slider and plurality of gears. The slider and the plurality of gears operate to transfer a rotational movement into a translational movement of at least one of the first housing or the second housing.

20 Claims, 19 Drawing Sheets

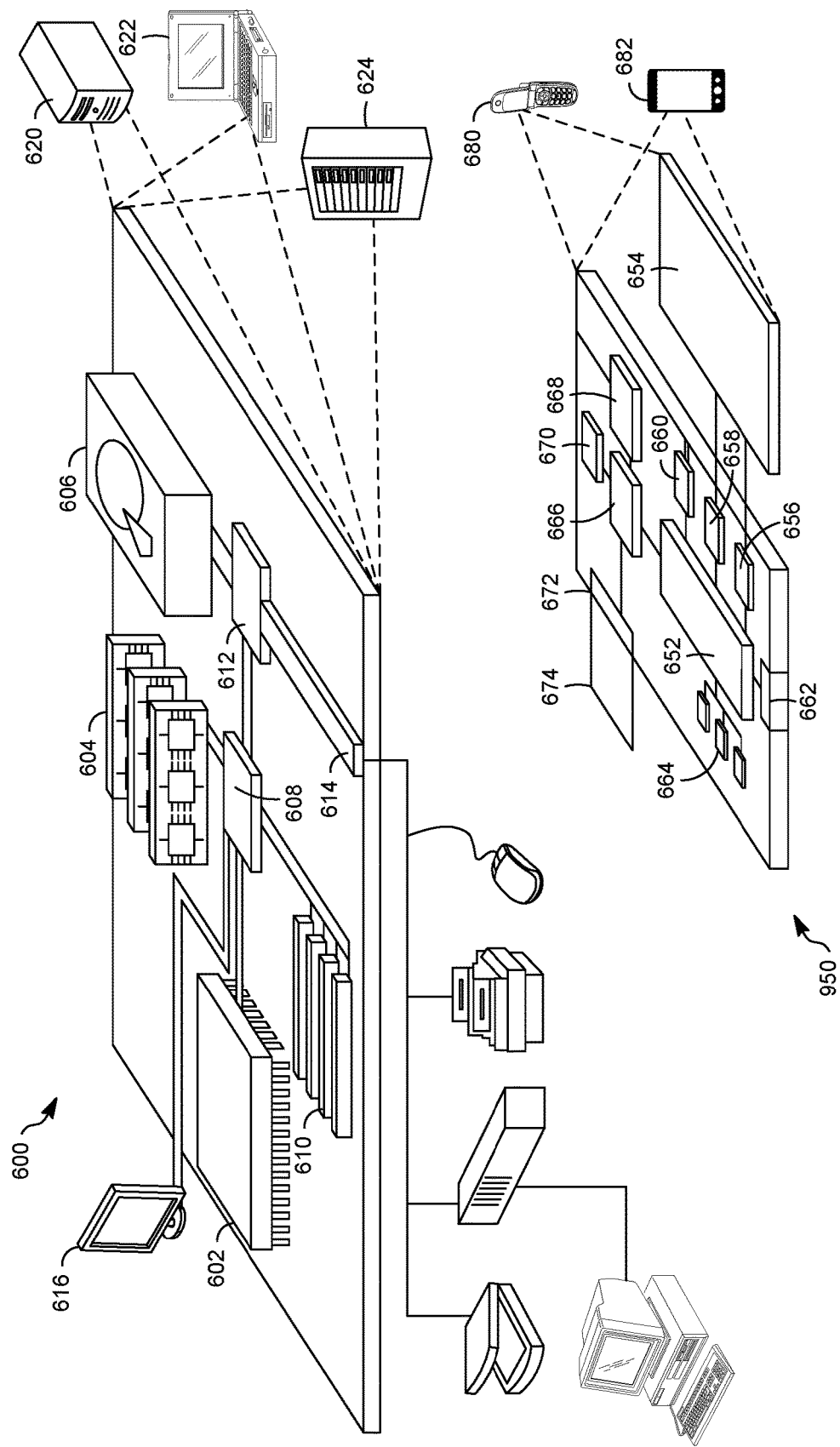

HINGE MECHANISM BY GEAR SET WITH SLIDER FOR FOLDABLE DISPLAY DEVICE

TECHNICAL FIELD

This disclosure relates generally to display devices, and, more particularly, to display devices that include a hinge mechanism for bending a flexible display.

BACKGROUND

Displays employed in electronic devices (e.g., cellular phones, portable computing devices, etc.) may be formed of a flexible substrate. The displays in some electronic devices may be folded (e.g., bent, closed, collapsed, etc.) by means of a hinge mechanism.

SUMMARY

In a general aspect, a foldable display device may include a processor, a memory, a first housing having a first end portion and a second end portion, a first length extending between the first end portion and the second end portion of the first housing, a second housing having a first end portion and a second end portion, a second length extending between the first end portion and the second end portion of the second housing, the second length being different than the first length, a flexible display disposed on the first housing and the second housing, and a hinge assembly disposed between the first housing and the second housing to rotate the first housing and the second toward each other. Upon the relative rotation occurring in a first direction, the slider moves and causes the first housing to translationally move in a first linear direction, and upon the relative rotation occurring in a second direction, the slider moves and causes the first housing to translationally move in a second linear direction. The second linear direction may be opposite to the first linear direction.

In another general aspect, a foldable display device may include a processor, a memory, a first cover housing and a second cover housing coupled together to define a first housing, a third cover housing and a fourth cover housing coupled together to define a second housing, a flexible display disposed on the first housing and the second housing, and a hinge assembly couple to the first cover housing and the third cover housing. The hinge assembly may include a slider and a set of gears disposed within the slider. In a first position of the display device, the slider may move in a first linear direction such that a first distance between an end portion of the first housing and an end portion of the second housing defines a first length. In a second position of the display device, the slider moves in a second linear direction, opposite the first linear direction, such that a second distance between the end portion of the first housing and the end portion of the second housing defines a second length. The second length may be greater than the first length.

BRIEF DESCRIPTION OF THE DRAWINGS

FIG. 7 illustrates an example of a computing device that can be used with circuits described here.

DETAILED DESCRIPTION

Figure 1A:
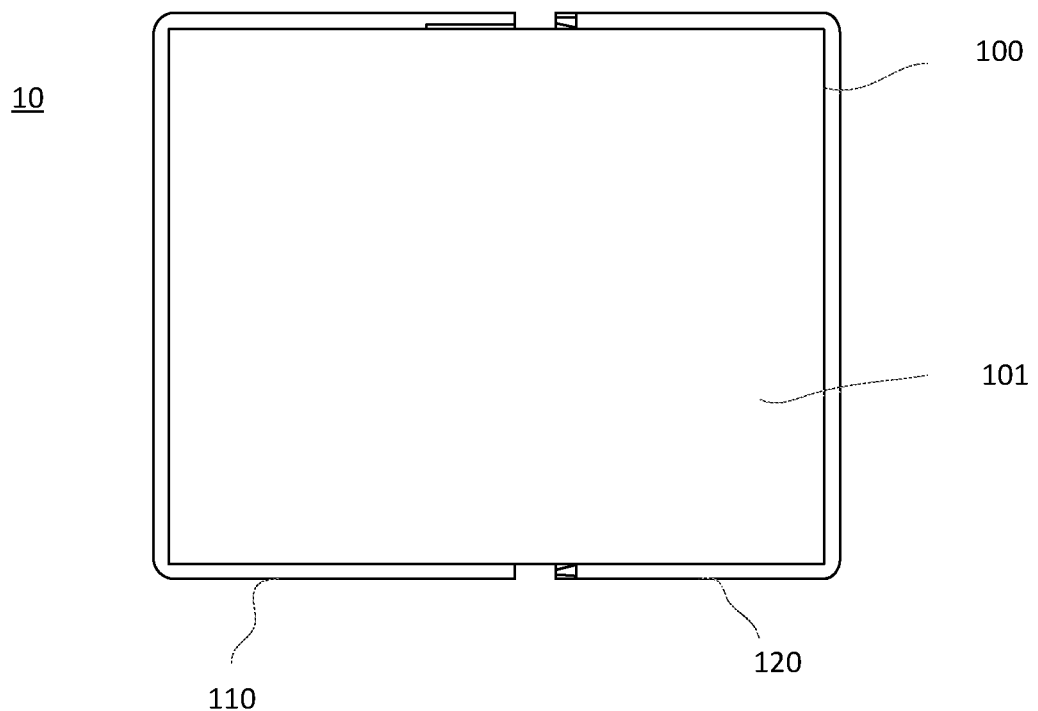
FIGS. 1A and 1B illustrate schematic views of an exemplary display device according to an example embodiment.

While example embodiments may include various modifications and alternative forms, embodiments described herein are shown by way of example in the drawings and will be described in detail. It should be understood, however, that there is no intent to limit example embodiments to the particular forms disclosed, but on the contrary, example embodiments are to cover all modifications, equivalents, and alternatives falling within the scope of the claims. Furthermore, the figures are intended to illustrate the general characteristics of methods and/or structure utilized in certain example embodiments and to supplement the written description provided herein. These figures are not, however, to scale and may not precisely reflect the precise structural or performance characteristics of any given embodiment, and should not be interpreted as defining or limiting the range of values or properties encompassed by example embodiments. For example, the structural elements may be reduced or exaggerated for clarity. The use of similar or identical reference numbers in the various drawings is intended to indicate the presence of a similar or identical element or feature.

Display devices (e.g., organic light-emitting diode (OLED) displays) may include a flexible display coupled to a housing member, which may fold or bend in a rotating manner about a hinge assembly. In some instances, the flexible display can be bent or folded such that the flexible display can face each other e.g., rotated 180°. In other words, a portion of the flexible display can be bent towards a portion of the flexible display that remains fixed or stationary. However, the bending of the flexible display may cause malfunction or breakage of the flexible display. Further, in some occasions, the bending action may cause a portion of the flexible display to become unattached (e.g., separated, decoupled, unconnected, etc.) to the housing member and form a ridge. In other words, a lifting or curling phenomenon of the flexible display caused by an excessive folding operation in an area corresponding to the hinge assembly can be formed. This causes unnecessary deformation and/or an uneven surface, which may distort images on the display.

Other flexible displays, which employ a hinge assembly, may use multiple shafts rotation hinges to fold the display. However, flexible displays using multiple shafts rotation hinges can be complex and include many parts. This may lead to more frequent breakage and expensive repairs. In most cases, one broken shaft or hinge will require replacement of the entire hinge assembly. Other flexible displays may include a biasing member (e.g., a spring) to rotate the hinge assembly. However, in this configuration, the biasing member causes a "pop-out" action (e.g., a rapid opening of the display device) to rotate the display device to an open position. In other words, the display device opens to a predetermined angle and cannot stop at various rotation angles. Moreover, in the above configurations, the display devices are generally larger and thicker due to the various parts required.

In order to resolve the above and/or other issues, exemplary foldable display devices as described herein may include a hinge assembly having a slider mechanism and a set of gears. The slider mechanism and the set of gears operate to transfer a rotational movement into a translational movement of one of a first housing or a second housing. More specifically, the hinge assembly can transfer a rotational movement (rotatable 180°) of the flexible device to a translational movement (e.g., sliding), and bend the flexible device without damage or breakage. Further, due to the translational movement, a flexible device can be completely attached (e.g., coupled, connected, affixed, etc.) to both of the first housing and second housing during folding and/or unfolding of the flexible device. In other words, there is no lifting or curling effect formed on the flexible display.

In addition, exemplary foldable display devices include a first housing having a first size and a second housing having a second size, in which the second size of the second housing being different than the first size of the first housing. For example, the first size of the first housing can be larger than the second size of the second housing. By this configuration, such an exemplary foldable display device can be transformed into two display devices (e.g., a full-display device or a half-display device). This can provide a foldable display device that is more versatile and user friendly. For instance, in a full-display device, the flexible display may display a video content (e.g., movie, games, film, etc.) to capture a full screen mode, and in a half-display device, the flexible display may display a print content (e.g., book, newspaper, article, etc.) to enlarge a size of the print content to fit an entire display area. Moreover, thicknesses of the first housing and the second housing can be different. For example, a portion of the first housing can have a first thickness that is larger than a second thickness of the second housing. This provides a foldable display device that is relatively thin as compared to conventional display devices.

Figure 1B:
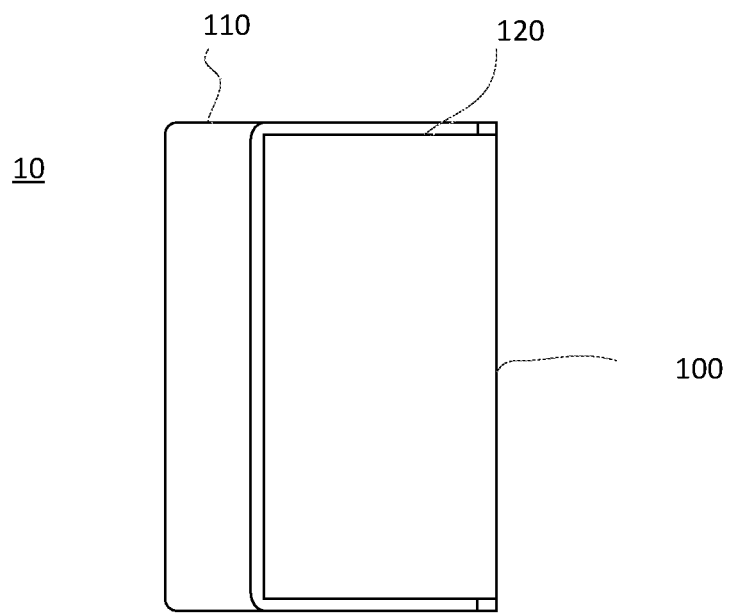

FIGS. 1A and 1B illustrate top views of an exemplary display device 10 according to an example embodiment. FIG. 1A illustrates the display device 10 in a full-display device (e.g., in a fully open position), and FIG. 1B illustrates the display device 10 in a half-display device (e.g., in a closed position or folded position). The display device 10 may be employed in a computing device such as a smart phone, a laptop computer, a tablet computer, a netbook computer, a mobile telephone, a media player, or other handheld or portable electronic device, such as a wrist-watch device. Other configurations may be used for display device 10 if desired. The example of FIGS. 1A and 1B are merely illustrative.

The display device 10 may include a flexible display 100 disposed on a first housing 110 and a second housing 120. In other words, the flexible display 100 can be coupled or attached to a surface 113 (shown in FIG. 1C of the first housing 110 and a surface 123 (shown in FIG. 1C) of the second housing 120. In some implementations, the flexible display 100 can be coupled or attached to a portion of the surfaces 113 and 123 of the first housing 110 and the second housing 120, respectively, by adhesive. For example, the adhesive may be a pressure sensitive adhesive, a foam adhesive, or other suitable adhesive.

The flexible display 100 may include an active area 101 (e.g., display area), in which an array of pixels (not shown) are formed. Other additional components for generating a variety of signals for operating the pixels in the display area may be included, such as, for example, a display driver integrated circuit, an inverter circuit, a multiplexer, an electro-static discharge (ESD) circuit, a power supply unit, and/or the like. In some implementations, the flexible display 100 may also include components associated with functionalities other than for operating the pixels of the flexible display 100. For example, the flexible display 100 may include components for providing a touch sensing functionality, a user authentication functionality (e.g., finger print scan), a multi-level pressure sensing functionality, a tactile feedback functionality and/or various other functionalities for the electronic device employing the flexible display 100. As illustrated in the exemplary embodiment shown herein, the flexible display 100 may be rectangular shaped. Other shapes may be employed, not limited to the exemplary embodiment described herein.

In some implementations, the first housing 110 and the second housing 120 may include metal (e.g., stainless steel, aluminum or aluminum alloy, etc.). In other implementations, the first housing 110 and the second housing 120 may include plastic, glass, ceramics, rubber, and/or other suitable materials, or combination of materials. In some implementations, the first housing 110 and the second housing 120 may be formed from the same material. In some implementations, the first housing 110 and the second housing 120 may be formed from different materials. In some implementations, the first housing 110 and the second housing 120 may be formed by injection molding or formed using multiple structures.

Figure 3:
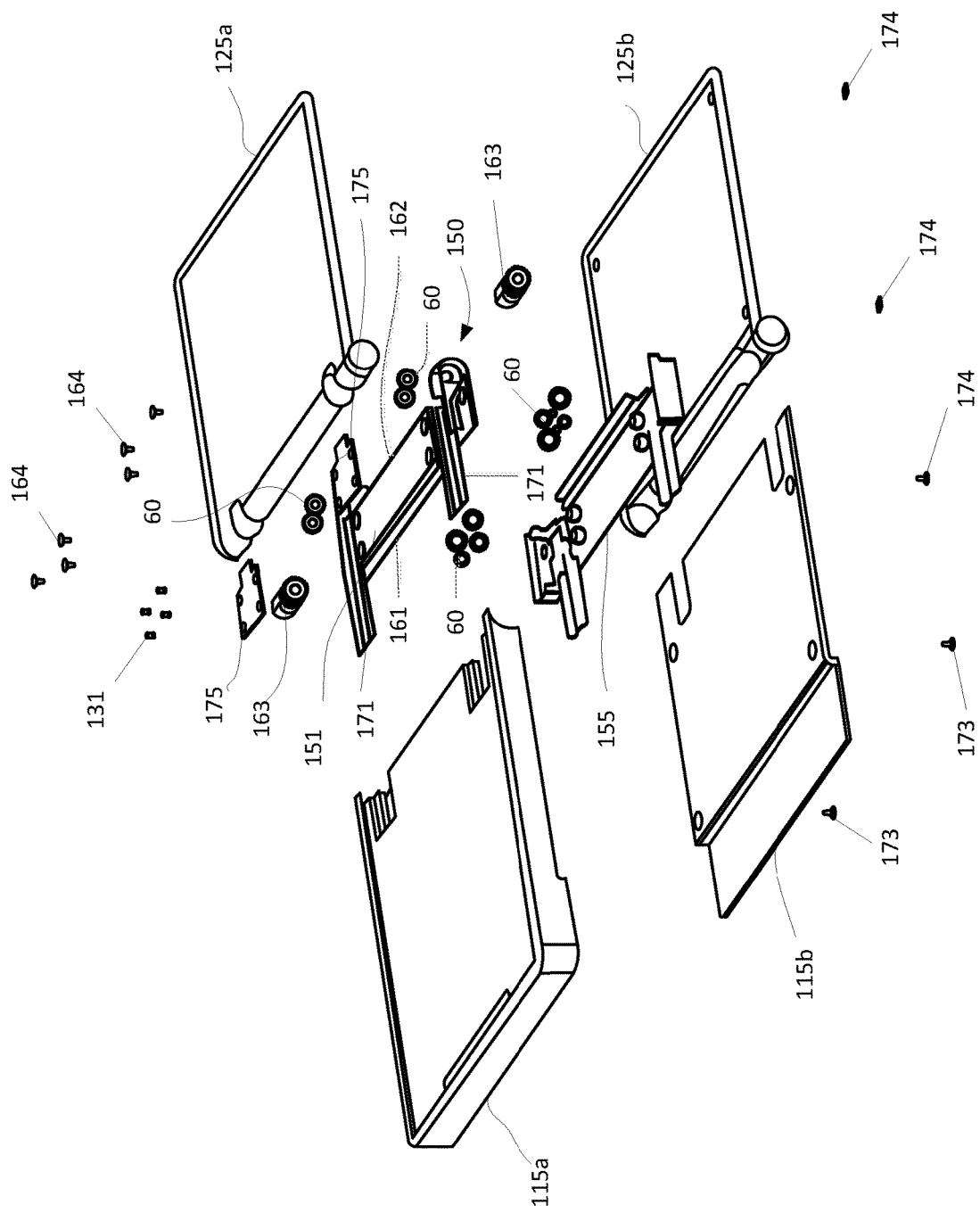
FIG. 3 is an exploded view of an exemplary display device according to an example embodiment.

Referring briefly to FIG. 3, the first housing 110 may include a first housing cover 115a and a second housing cover 115b coupled together forming an enclosure (e.g., housing, casing, etc.). The enclosure may include a cavity (e.g., opening, space, etc.) inside. Inside the enclosure of the first housing 110 may contain components for performing various functions of the electronic device 10. For example, the components may include a camera device, a speaker device, sensors (e.g., an optical sensor, a proximity sensor, an infrared sensor, an ultrasonic sensor, etc.), a light emitting diode (LED), a microphone, a flash device, a battery, etc. The first housing 110 will contain substantially most of the components as compared to the second housing 120. With this configuration, more or additional components can be installed therein and easier to repair. In some implementations, the first housing cover 115a and the second housing cover 115b may be coupled together using a fastening member 173, such as, a screw, for example. Other implementations may be employed, such as, for example, other mechanical fasteners, adhesive bonding, welding, etc.

The second housing 120 may include a first housing cover 125a and a second housing cover 125b coupled together forming an enclosure inside. As similar to the first housing 110, the enclosure of the second housing 120 may also include a cavity (e.g., opening, space, etc.) inside. Inside the enclosure of the second housing 120 may contain components for performing various functions of the electronic device 10. In some implementations, the first housing cover 125a and the second housing cover 125b may be coupled together using a fastening member 174, such as, a screw, for example. Other implementations may be employed, such as, for example, other mechanical fasteners, adhesive bonding, welding, etc.

Figure 1C:
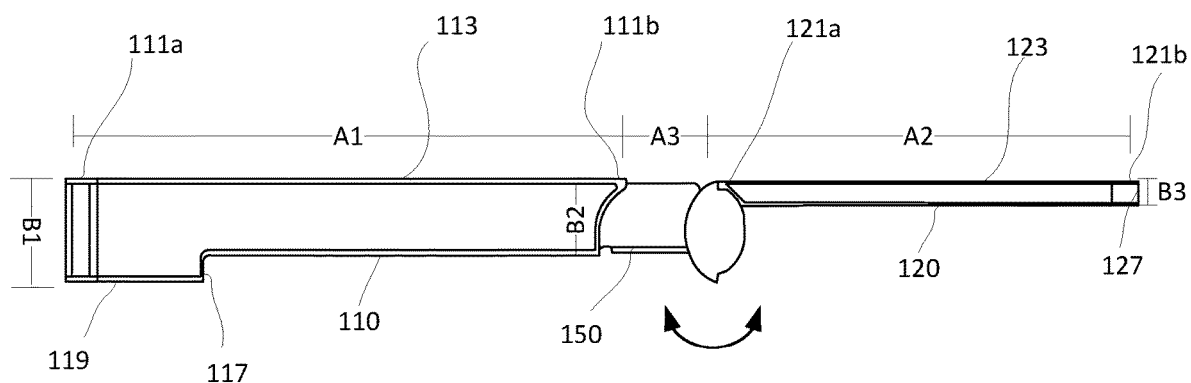
FIGS. 1C and 1D are side views of the exemplary display device shown in FIGS. 1A and 1B, respectively, according to an example embodiment.
Figure 1D:
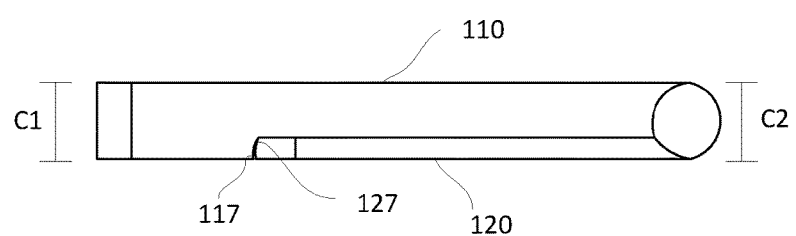

FIGS. 1C and 1D illustrate side views of the exemplary display device 10 according to an example embodiment. More specifically, FIG. 1C is a side view of FIG. 1A in the full-display device (e.g., in a fully open position); and FIG. 1D is a side view of FIG. 1B in the half-display device (e.g., in a folded position).

The first housing 110 includes a first end portion 111a and a second end portion 111b. Length A1 extends between the first end portion 111a and the second end portion 111b. The second housing 120 includes a first end portion 121a and a second end portion 121b. Length A2 extends between the first end portion 121a and the second end portion 121b. In an exemplary embodiment shown herein, lengths A1 and A2 can be different. For example, length A1 of the first housing can be larger than length A2 of the second housing. This permits the second housing 120 to be encased (e.g., embedded, surrounded, bordered, etc.) by the first housing 110 when in its folded position. To describe in another manner, a terminal end 127 of the second end portion 121b of the second housing 120 may contact a surface 117 of the first end portion 111a of the first housing 110 (as shown in FIG. 1D or FIG. 4B).

The first end portion 111a of the first housing 110 may have a first thickness B1 and the second end portion 111b of the first housing 110 may have a second thickness B2. In an exemplary embodiment shown herein, thicknesses B1 and B2 can be different. For example, thickness B1 of the first end portion 111a can be larger than thickness B2 of the second end portion 111b. The second housing 120 may include a third thickness B3 in the first end portion 121a and the second end portion 121b. In other words, the thickness of the second housing 120 may be the same, and thus, the third thickness B3 remains constant throughout the second housing 120. In some implementations, the third thickness B3 can be smaller than B1 or B2. In some implementations, each of the thickness B2 and the thickness B3 should not exceed the thickness B1. In some implementations, a combined thickness of B2 and B3 can be approximately the same as the thickness of B1. As such, when the display device 10 is in the folded position (e.g., half-display device), the surface 123 of the second housing 120 is aligned (e.g., even, level, flat, flush, etc.) with a surface 119 (positioned near the first end portion 111a of first housing 110). Alternatively, as shown in FIG. 1D, thickness C1 is equal to thickness C2. Hence, this can provide a display device that is thinner as compared to other conventional display devices.

Figure 2A:
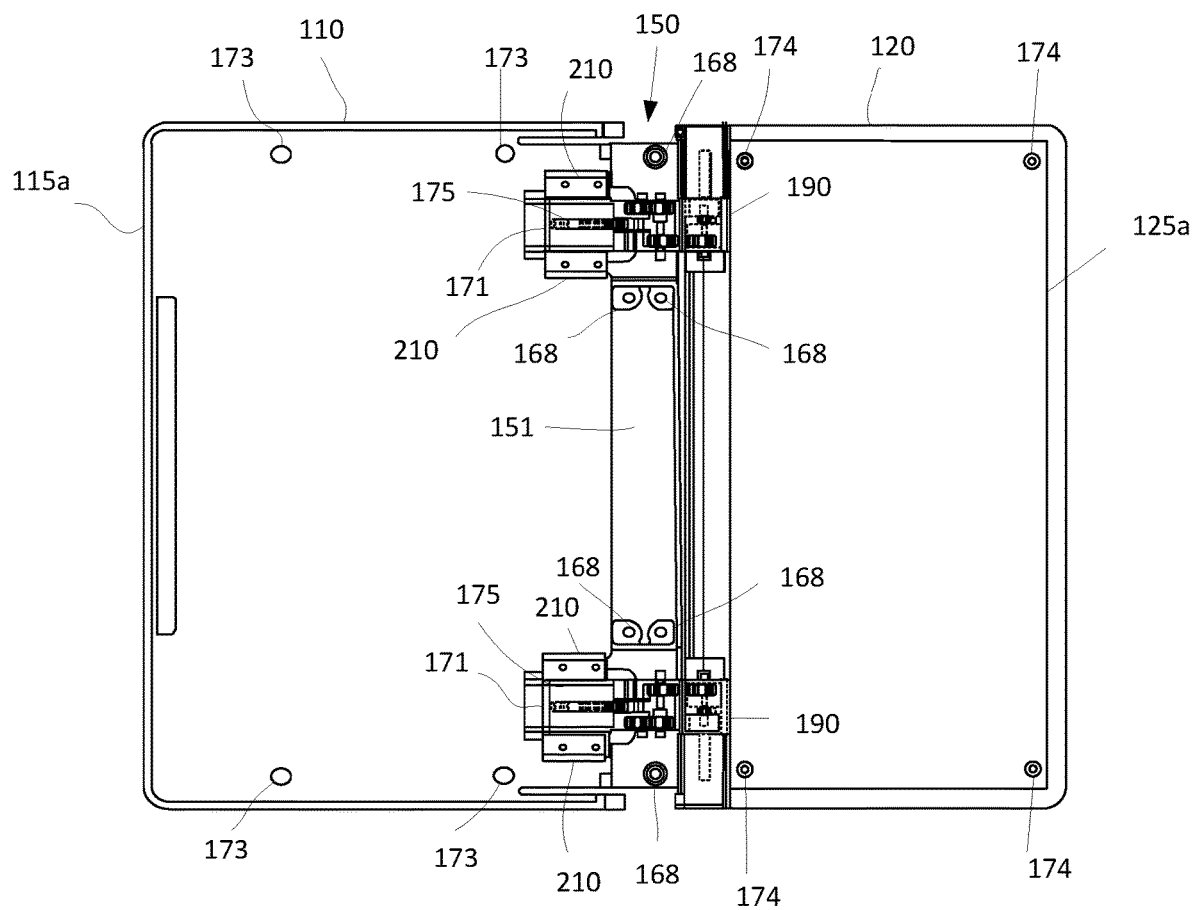
FIG. 2A is a top view of an exemplary display device without a display according to an example embodiment.
Figure 2B:
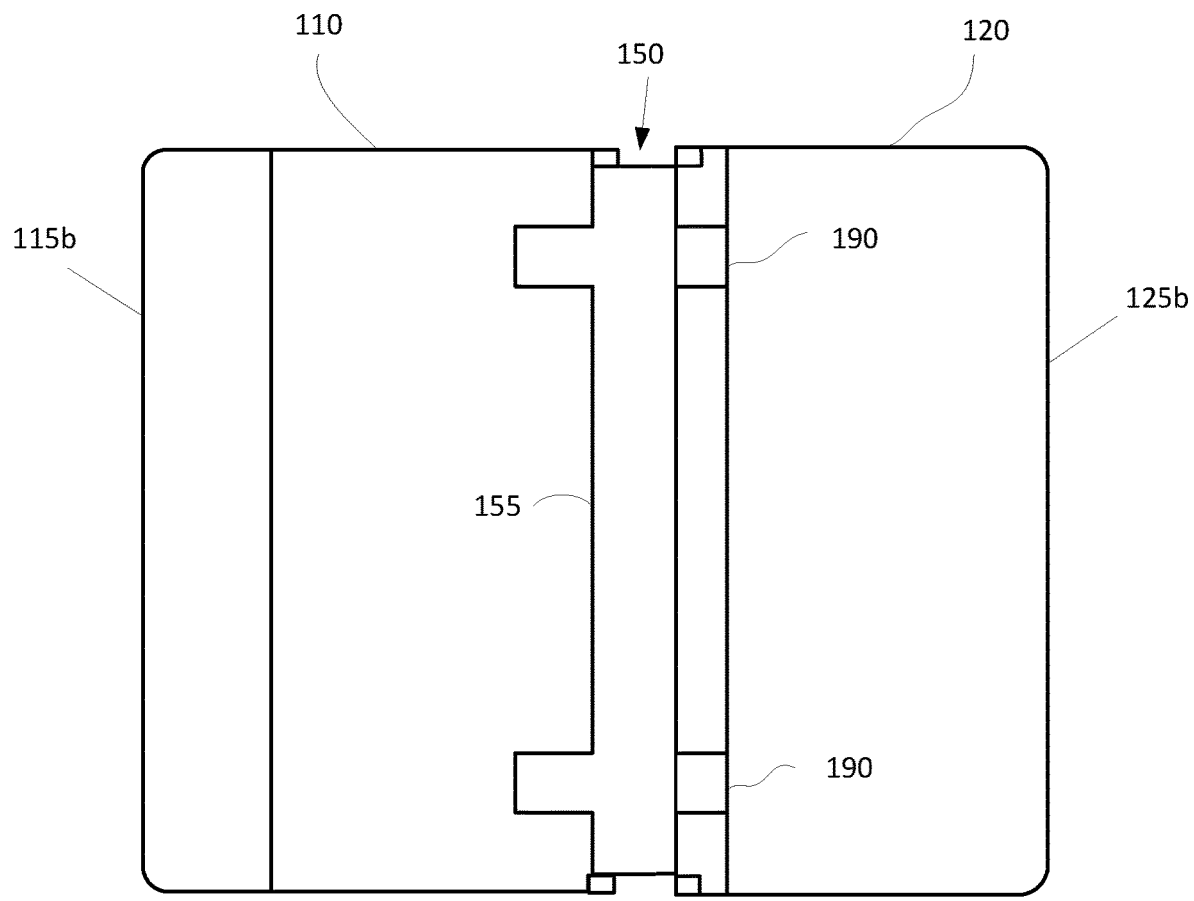
FIG. 2B is a bottom view of an exemplary display device according to an example embodiment.

FIG. 2A is a top view of an exemplary display device 10 (without the display 100) according to an example embodiment. FIG. 2B is a bottom view of an exemplary display device 10 according to an example embodiment.

Referring to FIGS. 2A and 2B, a hinge assembly 150 can be disposed between the first housing 110 and the second housing 120. In some implementations, the hinge assembly 150 can be attached (e.g., coupled, joined, etc.) to each of the first housing 110 and the second housing 120. The hinge assembly 150 may include at least a slider 151, a set of gears 60, a slider cover 155, and a rack 157, which will be described in detail later.

In use, the hinge assembly 150 may operate to transfer a rotational movement into a translational movement of the first housing 110 or the second housing 120. For example, when the second housing 120 is rotated (as indicated by arrow in FIG. 1C) from a closed or folded position (as shown in FIG. 1D) to an open or unfolded position (as shown in FIG. 1C), the hinge assembly 150 may operate to transfer the rotational movement of the second housing 120 into the translational movement of the first housing 110. That is, the first housing 110 attached to the hinge assembly 150 has moved (e.g., slid) a length A3. Due to the translational movement caused by the hinge assembly 150, the flexible display 100 can be substantially attached (e.g., coupled, connected, affixed, etc.) to the first housing 110 and the second housing 120 during folding and unfolding of the display device 10. Thus, there is no lifting or curling formed on the flexible display 100.

Figure 4A:
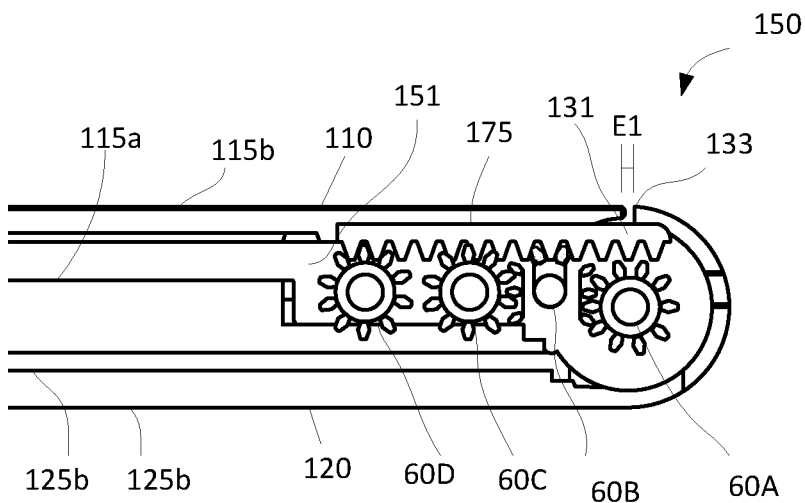
FIGS. 4A and 4B are cross-sectional views of a hinge assembly of an exemplary display device according to an example embodiment.
Figure 4B:
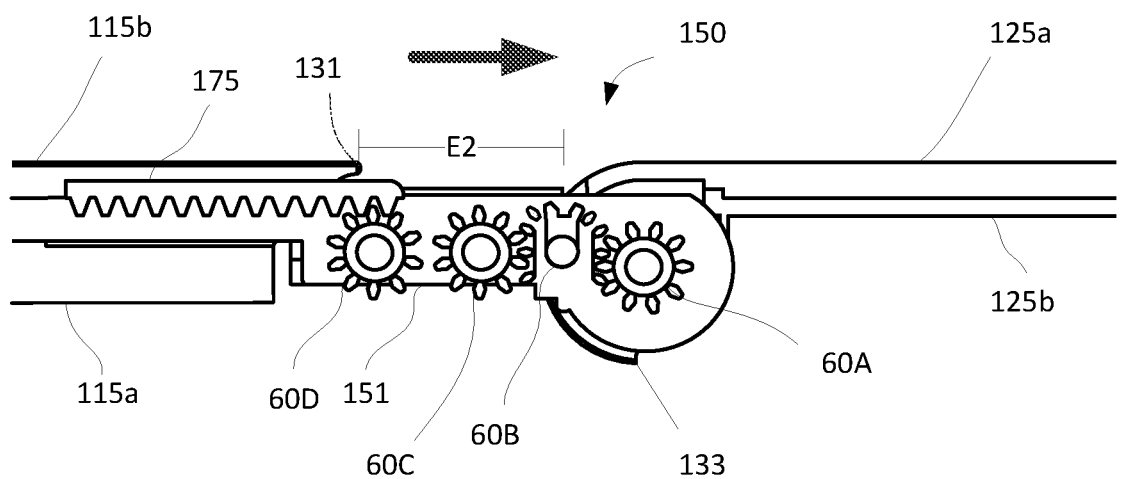

FIGS. 4A and 4B are cross-sectional views of the hinge assembly 150 of the display device 10 according to an example embodiment. FIG. 4A illustrates a folded state and FIG. 4B illustrates an unfolded state of the display device 10.

As shown in FIG. 4A, when the display device 10 is folded, a portion of the first housing 110 and a portion of the second housing 120 may be near or close to each other. More specifically, an end portion 131 of the first housing 110 can be close (e.g., near, adjacent, neighboring, etc.) to an end portion 133 of the second housing 120 defining a first length E1. To describe in another manner, the end portion 131 may face the end portion 133 of the second housing. In this configuration, the hinge assembly 150 is in its initial state and has not moved. Alternatively, when the display device 10 is unfolded (e.g., when the display device is opened), the end portion 133 of the second housing 120 is away (moved further away) from the end portion 131 of the first housing 120 defining a second length E2. That is, the end portion 133 may move in an opposite direction in relation to the end portion 131 and may face in substantially opposite direction. Accordingly, since the hinge assembly 150 has moved (e.g., translational movement) in a direction indicated by the arrow in FIG. 4B, this creates a distance as indicated by the second length E2. This translational (e.g., linear, sliding, etc.) movement should correspond to the rotational movement of the second housing 120 or vice versa. For example, when the second housing 120 is rotated (e.g., 180 degrees), the hinge assembly 150 can be moved proportionally a distance of length E2. Consequently, if the second housing 120 is rotated only 90 degrees, the hinge assembly 150 can be moved proportionally half of distance of length A3. Other rotated angles between 0 to 180 degrees may be operated such that a distance of the hinge assembly 150 can be moved proportionally. Further, the end portion 133 of the second housing can not only be moved in a linear direction, the end portion 133 can be rotated along an axis and may face in downwardly and opposite direction in relation to the end portion 131 (as shown in FIG. 4B).

Referring back to FIG. 3, the hinge assembly 150 may include the slider 151 disposed between the first housing 110 and the second housing 120. More specifically, the slider 151 can be coupled to the first housing cover 115a of the first housing 110 and the first housing cover 125a of the second housing 120. The slider 151 may include a first side end portion 161 and a second side end portion 161. In some implementation, the first side end portion 161 may be coupled to a surface 182 (as shown in FIG. 6F) of the first housing cover 115a of the first housing 110 and the second side end portion 162 may be coupled to the first housing cover 125a of the second housing 120.

In some implementations, the slider 151 may be formed from metal (e.g., stainless steel, aluminum or aluminum alloy, etc.). In other implementations, the slider 151 may be made from plastic, glass, ceramics, rubber, or other suitable materials, or combination of materials. In some implementations, the slider 151 may be made from the same material as the first housing 110 and/or the second housing 120. In some implementations, the slider 151 may be made from the different material as the first housing 110 and/or the second housing 120.

The slider 151 may include an extension member 171 on the first side end portion 161 of the slider 151. In the exemplary embodiment described herein, the extension member 171 may extend outwardly from the first side end portion 161 of the slider 151. In other words, the extension member 171 may extend in an orthogonal direction with respect to the first side end portion 161. The extension member 171 may be used to connect the slider 151 to the first housing cover 115a of the first housing 110.

According to an example embodiment, although one pair of extension members 171 having same structure formed on the slider 151 in the following description, only one extension member 171 will be described. However, it is apparent that the other extension member 171 may have the same structure. Further, although a structure in which one pair of extension members 171 is illustrated and described, the present disclosure is not limited thereto. For example, one extension member 171 may present, or three or more extension members 171 may be present.

Figure 6A:
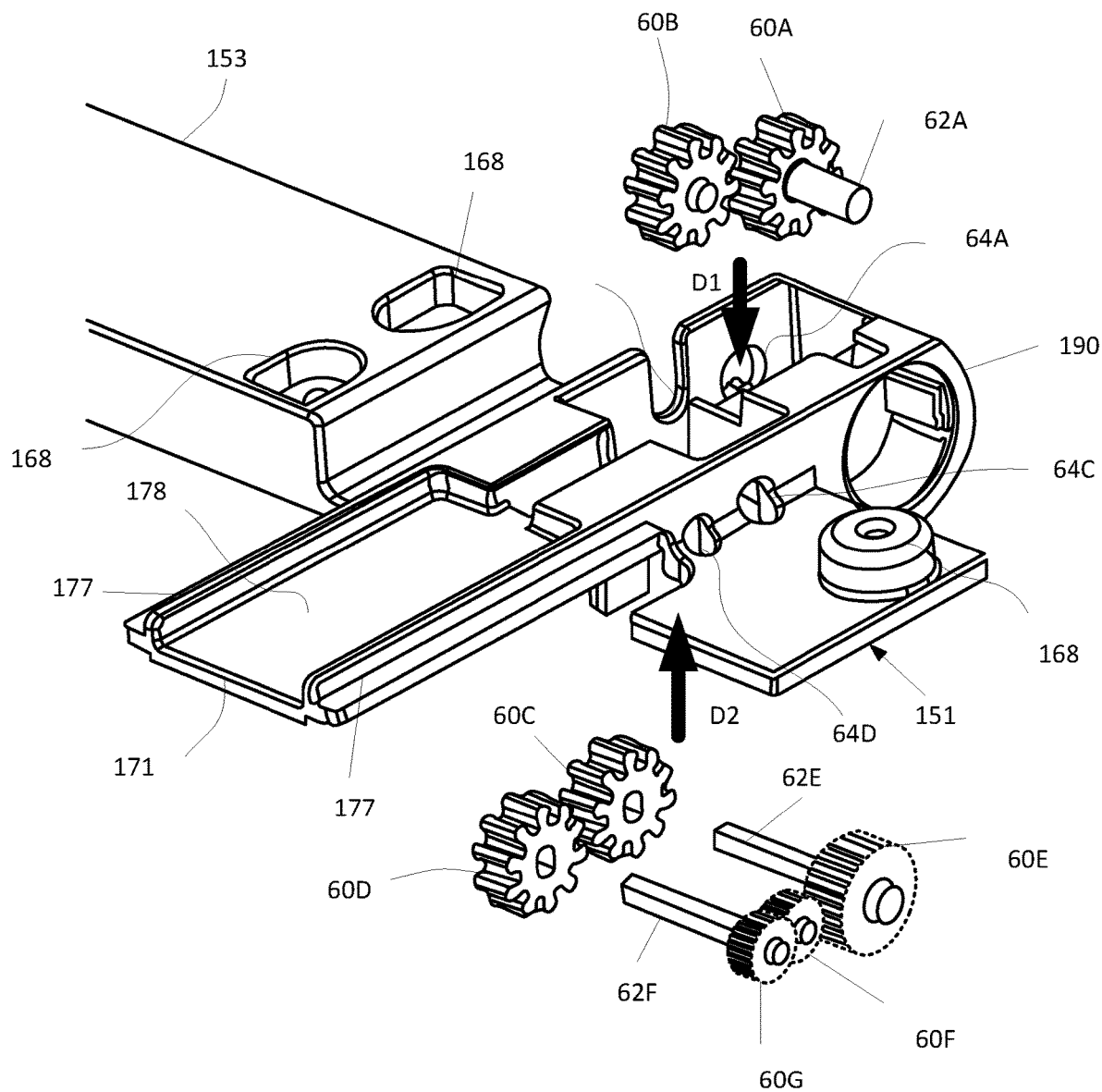
FIGS. 6A through 6P illustrate schematic views of assembling an exemplary display device according to an example embodiment.
Figure 6B:
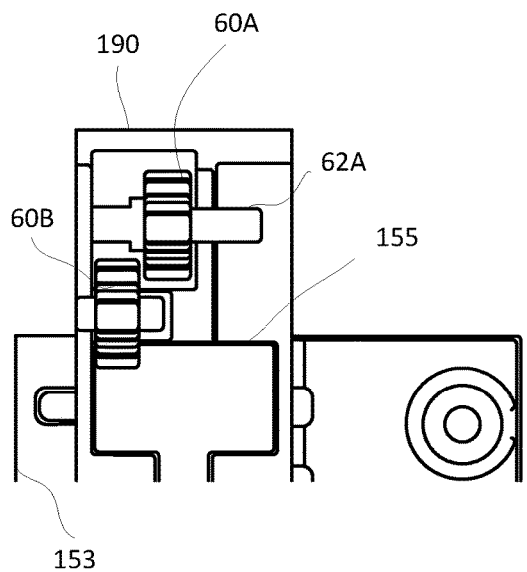
Figure 6C:
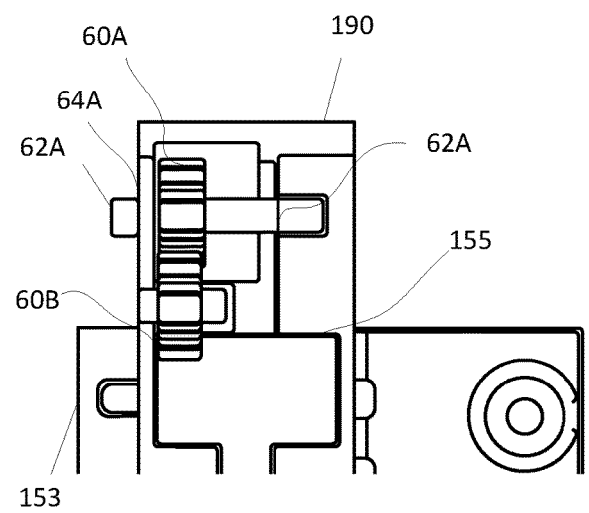
Figure 6D:
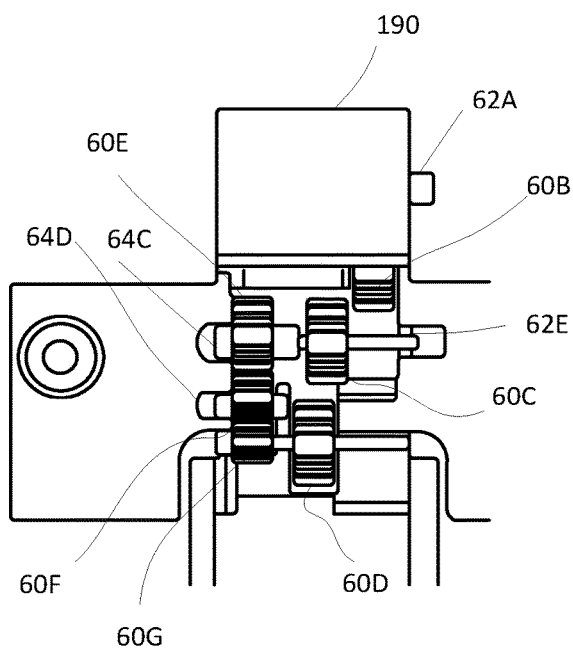
Figure 6E:
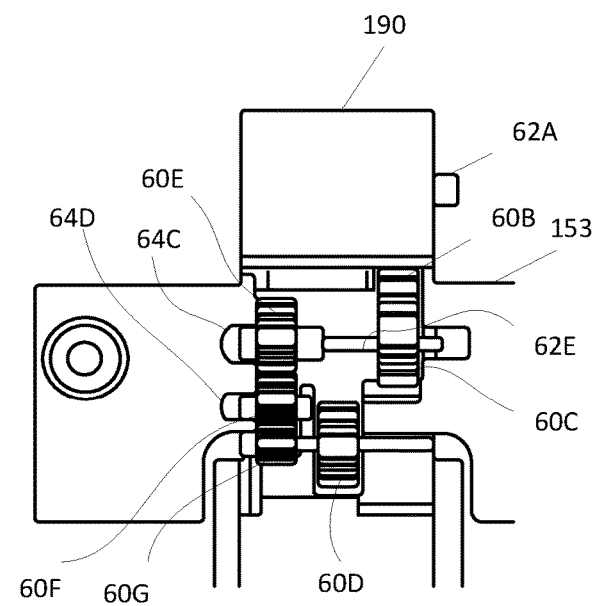
Figure 6F:
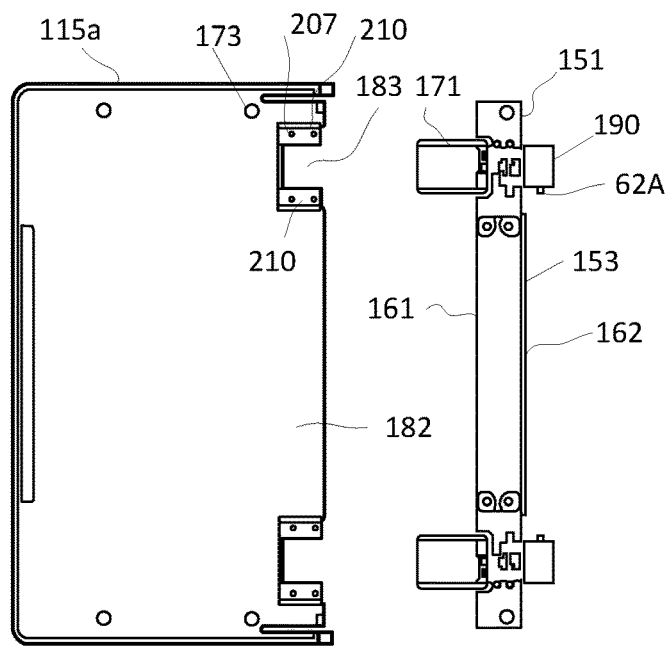
Figure 6G:
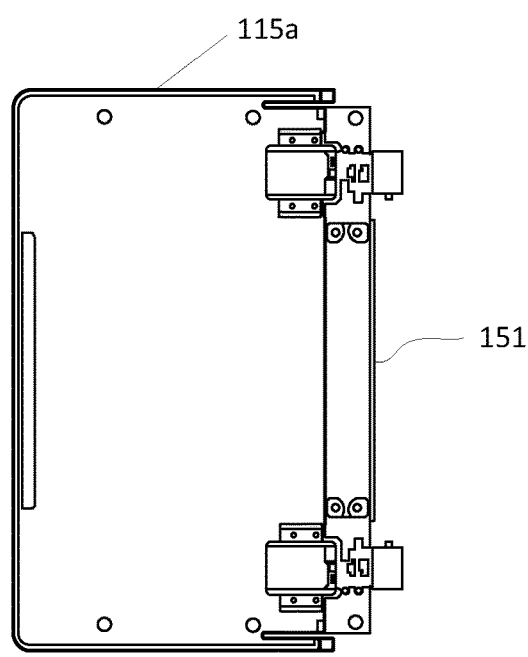

In some implementations, the extension member 171 can slide into an opening 183 formed in the first housing cover 115a of the first housing 110 (as shown in FIGS. 6F and 6G). In some implementations, the first housing cover 115a may include grooves formed on each side of the opening 183. In other words, a portion of the first housing cover 115 may form an overlapping portion 210 over the opening 183 such that the overlapping portion 210 may overlap with the extension member 171 and provide a secure fit. The extension member 171 may move (e.g., slide back and forth) within the opening 183 based on the movement of the second housing 120. In some implementations, the extension member 171 can have similar shape and size as the opening 183 so to provide a complementary fit. In an exemplary embodiment as described herein, the extension member 171 has a substantially rectangular shape. Other shapes and sizes of the extension member 171 may be employed as long as the extension member 171 corresponds to the shape and size of the opening 183. In some implementations, lubricant, such as, for example, TEFLON lubricant may be used between the extension member 171 and the opening 183 to reduce friction and protect moving parts and prevent rust.

Figure 5A:
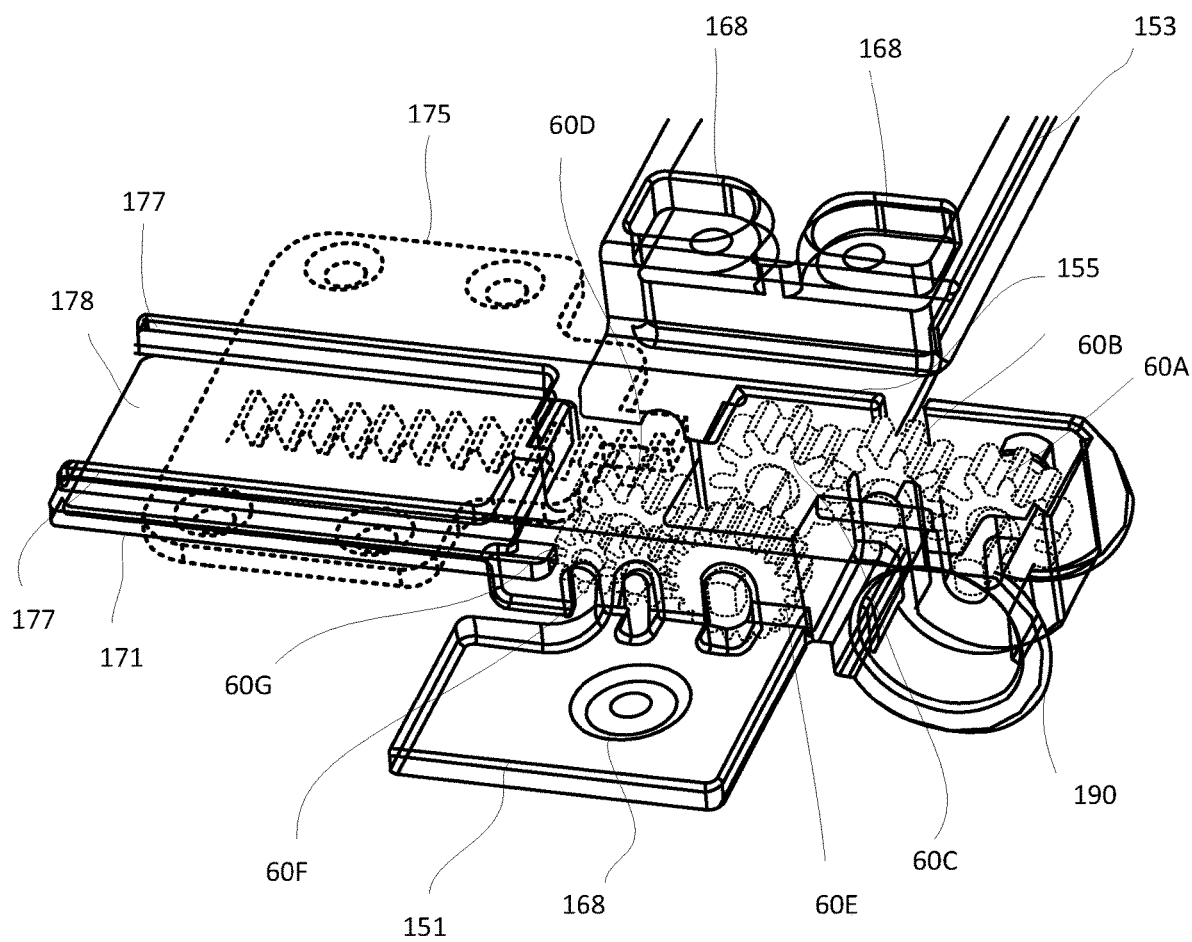
FIGS. 5A through 5D illustrate schematic views of a portion of a hinge assembly according to an example embodiment.

In some implementations, the extension member 171 may include projection members 177 on a surface 178 of the extension member 171, as shown in FIG. 5A. In some implementations, the projection members 177 may be located at each longitudinal side end portions of the extension member 171. In other words, the projection members 177 may be disposed in a parallel manner with respect to each other. The projection members 177 may be formed on the extension member 171 to engage with corresponding members formed on the surface of the first housing cover 115a. For example, a portion of the surface 182 of the first cover housing 115a that engages the projection members 177 may include grooves (e.g., channels) such that the projection members 177 may cooperatively engage with the grooves formed on the surface 182. The projection members 177 ensure that the extension member 171 does not disengage with the first housing cover 115a of the first housing 110.

Figure 6H:
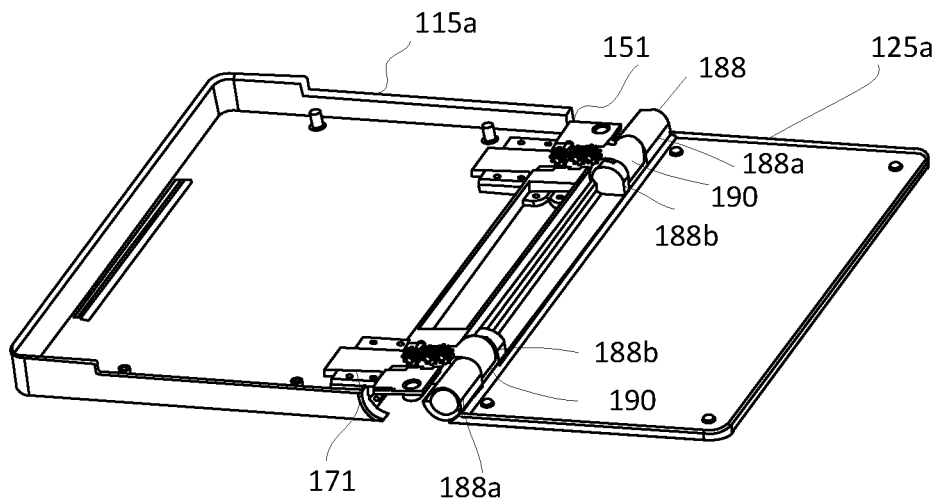

On the second side end portion 162 of the slider 151, a gear housing 190 may be formed thereof. The gear housing 190 may house at least gear 60A (and a portion of gear 60B) that engages with other gears in the slider 151, which will be described later in detail herein. In some implementations, the gear housing 190 may be a substantially cylindrical structure. The gear housing 190 may correspond to a shape of the shaft gear 60 disposed therein and can protect shaft gear 60 from damage and mis-alignment. In other words, a size of an inner bore of the gear housing 190 should be sufficient to accommodate the shaft gear 60. The gear housing 190 can be configured to be coupled to the first housing cover 125a of the second housing 120. More specifically, the gear housing 190 can be coupled to a connection member 188 formed on the first housing cover 125a, as shown in FIG. 6H. The gear housing 190 can cooperatively engage with the connection member 188 due to the gear housing 190 and the connection member 188 having substantially similar shape.

In some implementations, the connection member 188 may include a first connecting portion 188a and a second connecting portion 188b spaced apart from each other. Due to the spacing of the first connecting portion 188a and the second connecting portion 188b, an opening 195 can be formed between the first and second connecting portions 188a, 188b. A size and shape of the opening 195 should correspond to a size and shape of the gear housing 190 for engagement. The engagement of the gear housing 190 in the opening 195 should be tight such that the gear housing 190 does not move within the opening 195 when engaged. In some implementations, one of the first connection portion 188a and the second connection portion 188b may include a slot 189 formed at a sidewall 193, as shown in FIG. 6K. The slot 189 cooperatively receives a shaft 62 of the shaft gear 60 disposed in the gear housing 190. That is, the shaft 62 of shaft gear 60 may slide into the slot 189 and may affix (e.g., connect, attach, etc.) the shaft gear 60 to the connection member 188 of the first housing cover 125a. Therefore, the second side end portion 162 of the slider 151 can be coupled to the first housing cover 125a of the second housing 120.

According to an example embodiment, although one pair of gear housing 190 having the same structure and one pair of connection member 188 having the same structure are coupled to each other in the description, only one gear housing 190 and connection member 188 will be described. However, it is apparent that the other gear housing 190 and connection member 188 may have the same structure. Further, although a structure in which one pair of gear housings 190 and one pair of connection members 188 are illustrated and described, the present disclosure is not limited thereto. For example, one gear housing 190 and one connection member 188 may be present, or three or more gear housings 190 and three or more connection members 188 may be present.

Figure 5B:
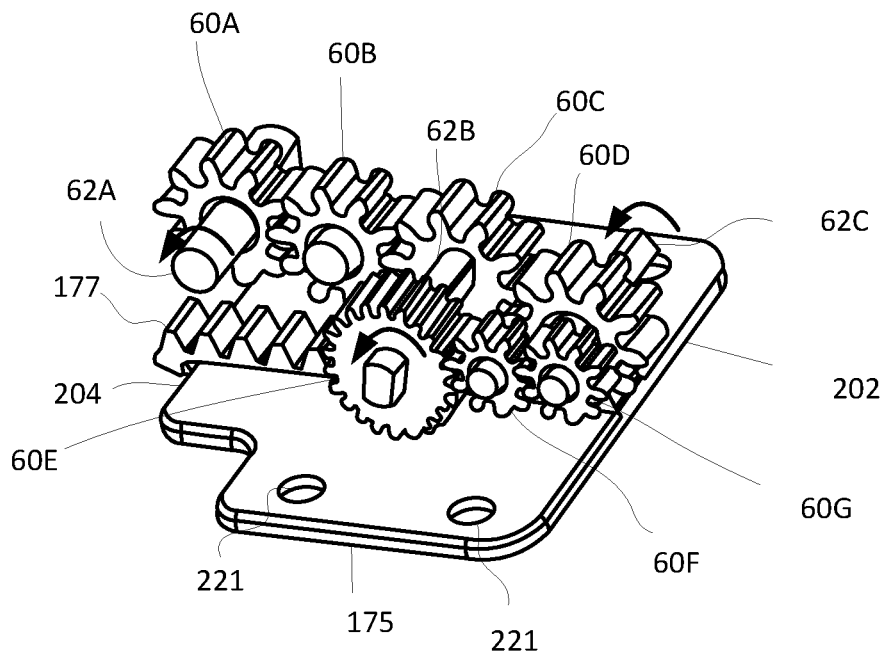
Figure 5C:
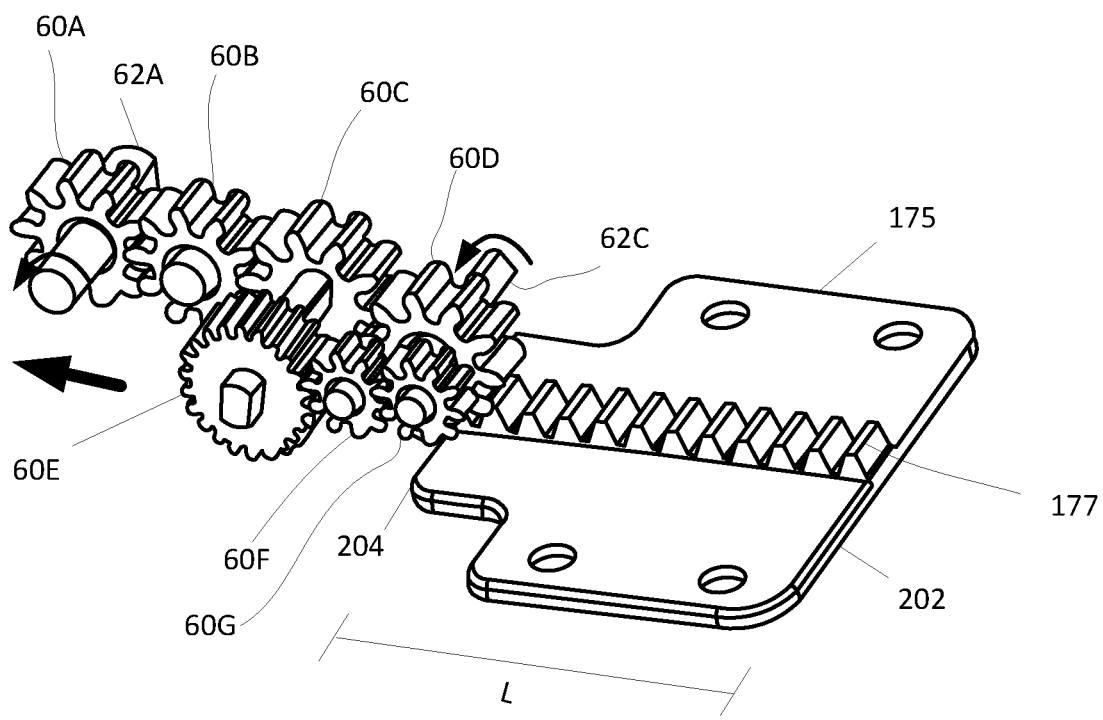

Referring to FIGS. 5A through 5C, the set of gears 60 may include the first gear 60A, a second gear 60B, a third gear 60C, a fourth gear 60D, a fifth gear 60E, a sixth gear 60F, and a seventh gear 60G. FIGS. 5B and 5C illustrate the set of gears 60 in an opposite orientation of FIG. 5A in order clearly show the set of gears 60 operating with the gear rack 175. As discussed above, the first gear 60A can be housed and mounted in the gear housing 190 of the slider 151. Further, within the gear housing 190, a portion of the second gear 60B can also be housed and mounted in the gear housing 190. The gears 60C to 60G can be housed and mounted in a main portion 153 of the slider 151. More specifically, the main portion 153 of the slider 151 can include an opening 155 in which gears 60C to 60G may be mounted therein, as shown in FIGS. 6B and 6C. The main portion 153 may also house a portion of the second gear 60B. Each of the set of gears 60 may be mounted to a respective shaft to rotate the respective gears.

As shown in FIGS. 5B and 5C, the first gear 60A may mesh with the second gear 60B, the second gear 60B may mesh with the third gear 60C, and the third gear 60C may mesh with the fourth gear 60D. The fifth gear 60E may mesh with the sixth gear 60F, and the sixth gear 60F may mesh with the seventh gear 60G. The third gear 60C and the fifth gear 60E may be mounted on a shaft 62B. In other words, the third gear 60C and the fifth gear 60E may be mounted on the same shaft 62B and share equivalent drive ratio. Similarly, the fourth gear 60D and the seventh gear 60G may be mounted on a shaft 62C, and may share the respective equivalent drive ratio.

As illustrated in exemplary embodiments described herein, the first gear 60A, the second gear 60B, the third gear 60C, and fourth gear 60D may each have a gear module of 0.4 having 10 teeth. The fifth gear 60E may have a gear module of 0.2 having 22 teeth. The sixth gear 60F and seventh gear 60G may have a gear module of 0.4 having 10 teeth. Other gear profiles, gear modules, and number of teeth may be employed as long as a gear ratio matches a translational ratio to move the first and second housings 110, 120.

Referring back to FIGS. 4A and 4B, the teeth of the third gear 60C and the fourth gear 60D may protrude partially upwardly over the slider 151 and mesh with a gear rack 175. The gear rack 175 may be affixed to the first housing cover 115a of the first housing 110. More specifically, the gear rack 175 may be coupled to the surface 182 (over the opening 183) of the first housing cover 115a of the first housing 110. In some implementations, the gear rack 175 may be coupled to the first housing cover 115a using mechanical fasteners 131, such as, for example, screws. In some implementations, the gear rack 175 may include holes 221 such that the mechanical fasteners 131 may be inserted therethrough and fasten the gear rack 175 to the first housing cover 115a. In an example embodiment shown herein, there may be four holes 221 formed on the gear rack 175. Other implementations may contain less or more holes 221 on the gear rack 175.

Further, the gear rack 175 may include a plurality of teeth 177 to engage (mesh) with teeth of at least the third gear 60C and the fourth gear 60D. As illustrated in the exemplary embodiment described herein, the gear rack 175 may have 11 teeth extending from a first end 202 to a second end 204 Other implementations may include less or more teeth as long as the gear modules match the set of gears 60, in particular, at least the third gear 60C and the fourth gear 60D.

FIG. 5B illustrates the set of gears 60 in a position when the display device 10 is in the closed or folded position; and FIG. 5C illustrates the set of gears 60 in a position when the display device 10 is in the open or unfolded position. As illustrated in FIG. 5B, in an initial position, the fourth gear 60D is positioned at the first end 202 of the gear rack 175. As the second housing 120 is rotationally moved, the gear 60A (which is housed in the gear housing 190 of the slider 151) rotates and causes rotation to the second gear 60B and the third gear 60C, and eventually to the fourth gear 60D. This causes the third gear 60C and the fourth gear 60D to translationally move across the teeth 179 of the gear rack 175, as shown by an arrow in FIG. 5C. In other words, the fourth gear 60D has moved from the first end 202 to the second end 204 of the gear rack 175. To describe in a different manner, the fourth gear 60D has moved a length L or stroke (e.g., moved over 11 teeth of the gear rack 175). In one exemplary implementation in relation to a gear module translational ratio, when the first gear 60A is rotated 180 degrees, the fourth gear 60D is rotated 360 degrees, which causes a translational movement via the gear rack 175 (e.g., over 11 teeth). Thus, the set of gears 60 transfers a rotational movement via at least the first gear 60A of the second housing 120 into a translational movement via at least the third gear 60C and the fourth gear 60D of the first housing 110. For example, when the second housing 120 is rotated from a closed or folded position to an open or unfolded position, the set of gears 60 may operate to transfer the rotational movement into the translational movement.

Figure 5D:
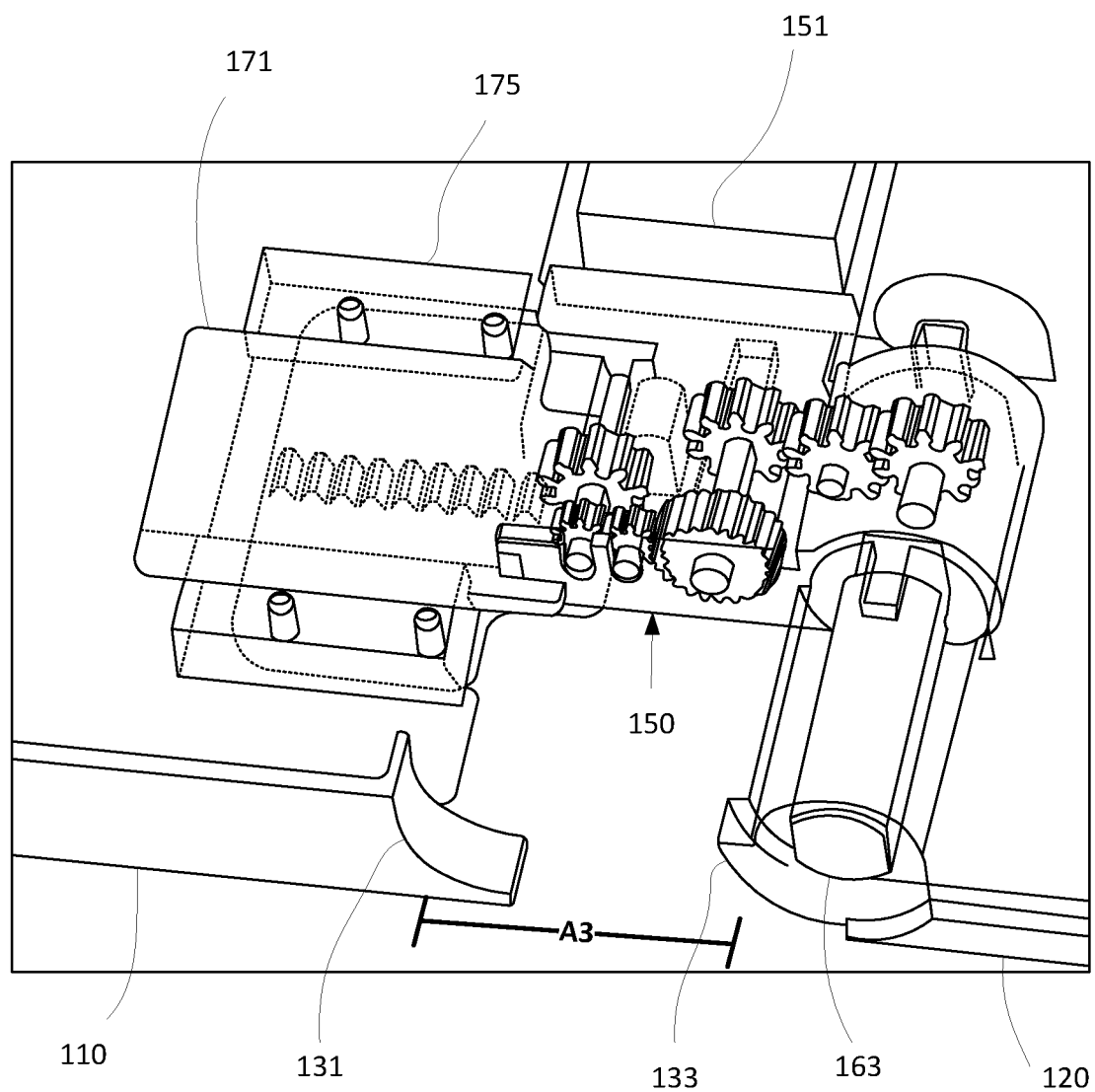

FIG. 5D illustrates the hinge assembly 150 of FIG. 5A attached to the first housing 110 and the second housing 120. Thus, similar elements will not be discussed in detail herein. As shown in FIG. 5D, the first housing 110 attached to the hinge assembly 150 has translationally moved the length A3. This indicates that the display device 10 is in the open or unfolded position. Conversely, when the display device 10 is in the closed or folded position, the length A3 is small In other words, as discussed previously, the first housing 110 and the second housing 120 may be near (e.g., close, neighboring, etc.) each other. For example, the end portion 131 of the first housing 110 may be near to the end portion 133 of the second housing 120. In some implementations, the end portion 131 may include a curved portion corresponding to a curved portion of the end portion 133.

As shown in FIG. 5D, a free-stop hinge device 163 may be disposed in the first housing cover 125a of the second housing 120. In some implementations, the free-stop hinge device 163 may be disposed in the connection member 188 of the first housing cover 125a. The free-stop hinge device 163 may provide a force for stopping the first housing cover 125a at various angles (e.g., 0° to 180°). For example, the free-stop hinge device 163 may stop at approximately 0°~15°, 15°~165°, and 165°~180°.

Figure 6I:
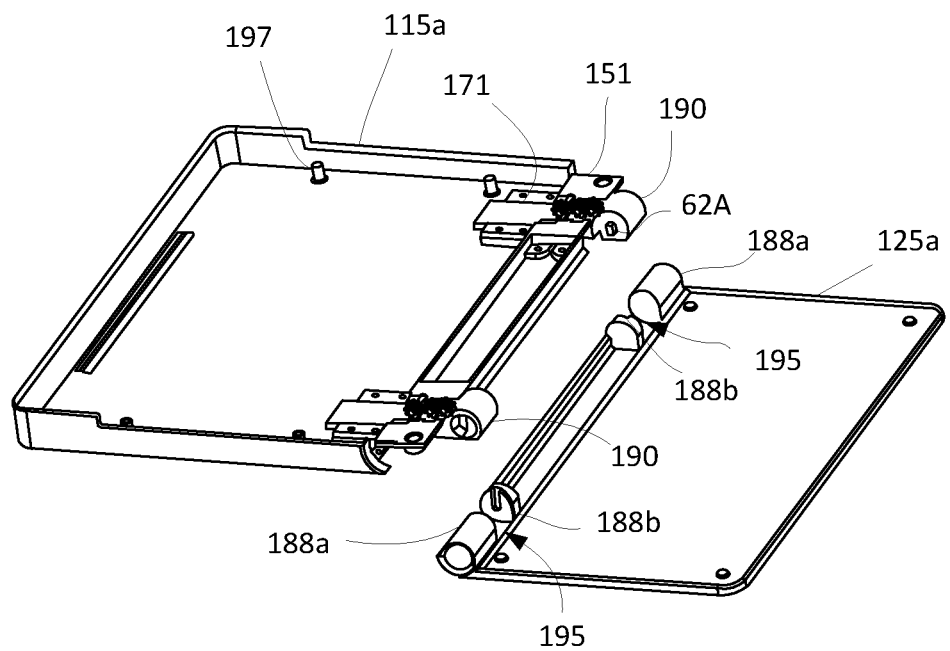
Figure 6J:
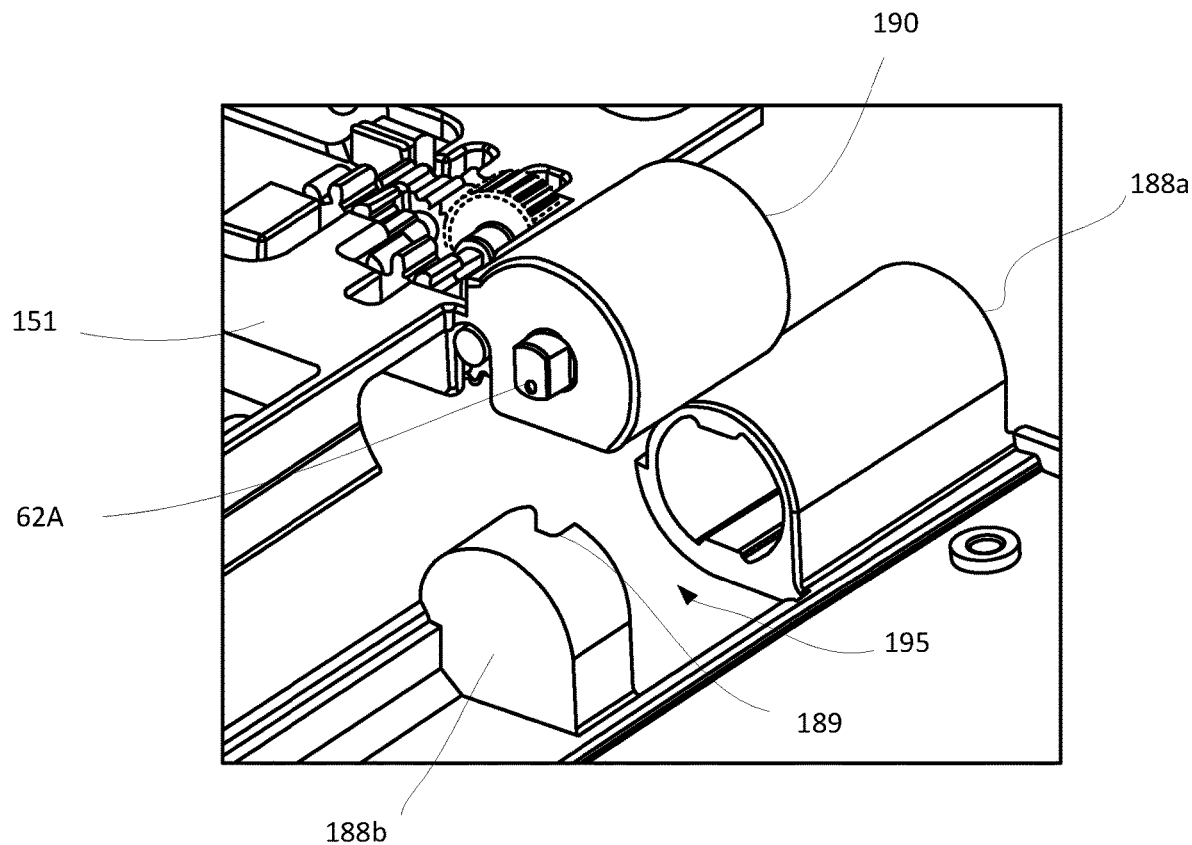
Figure 6K:
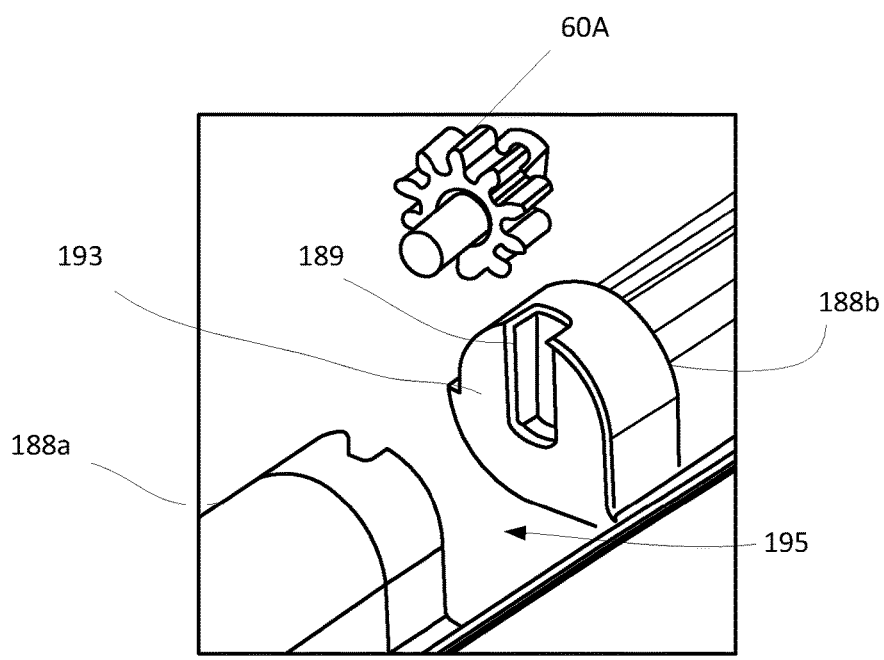
Figure 6L:
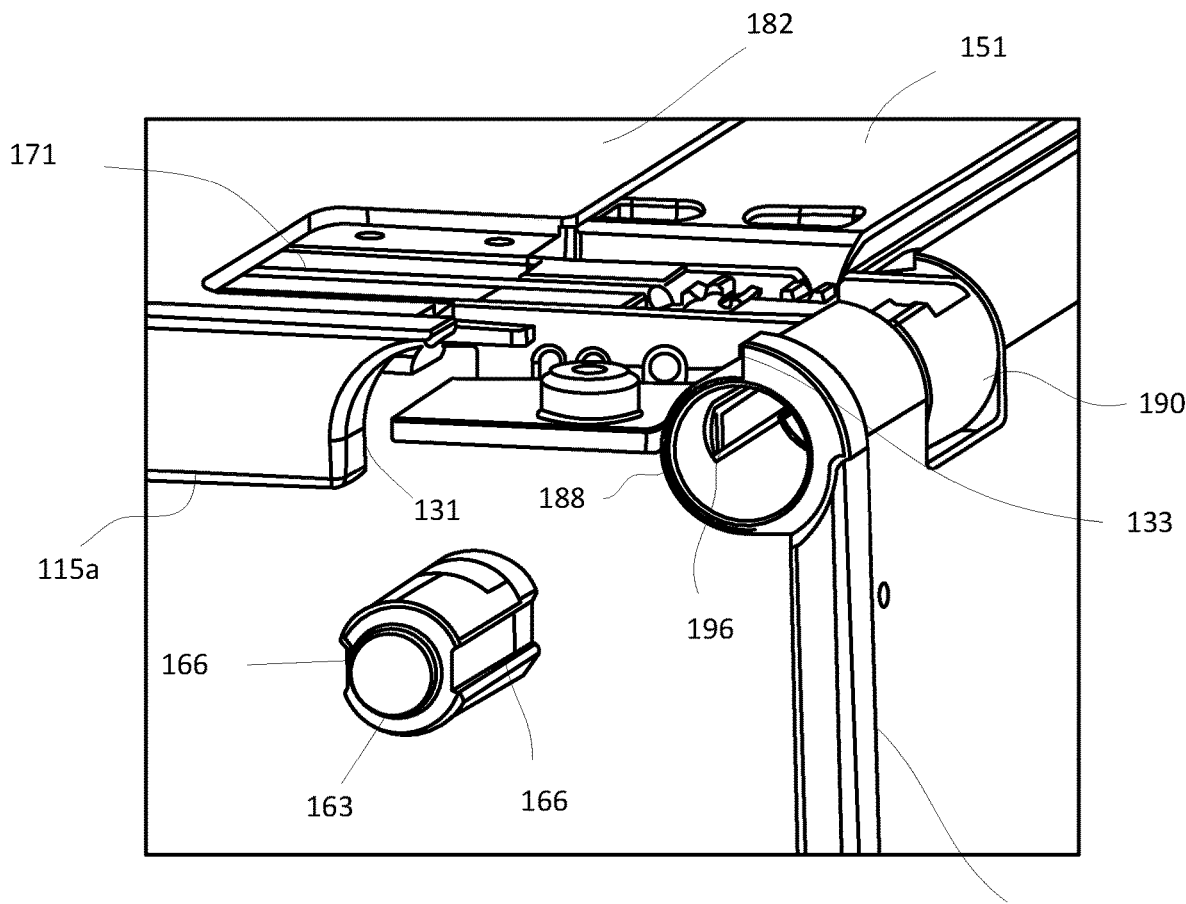
Figure 6M:
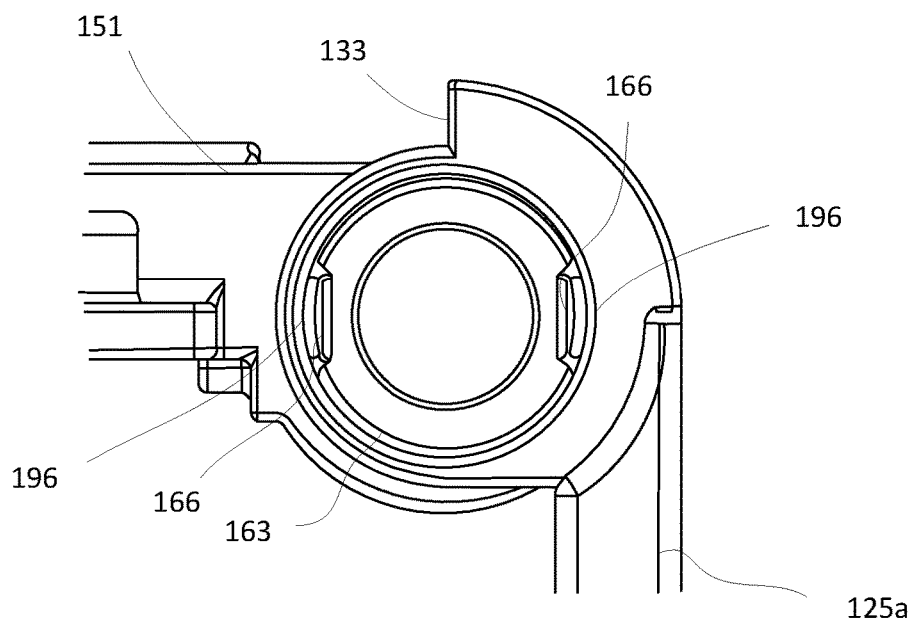

Referring to FIGS. 6L and 6M, the free-stop hinge device 163 may include a slot member 166. In some implementations, the slot member 166 may be located on two sides of the free-stop hinge device 163. At an inner surface of the connection member 188, a rib 196 may be formed to correspond to the slot member 166 of the free-stop hinge device 163. In other words, when the free-stop hinge device 163 is inserted into the connection member 188, the slot member 166 should be aligned with the rib 196 and placed inside the connection member 188 to be secured. The free-stop hinge device 163 can then rotate with the connection member 188 at various angles. In some implementations, the slot member 166 can have other shapes and sizes as long the slot member 166 corresponds to the rib 196 of the connection member 188.

Figure 6N:
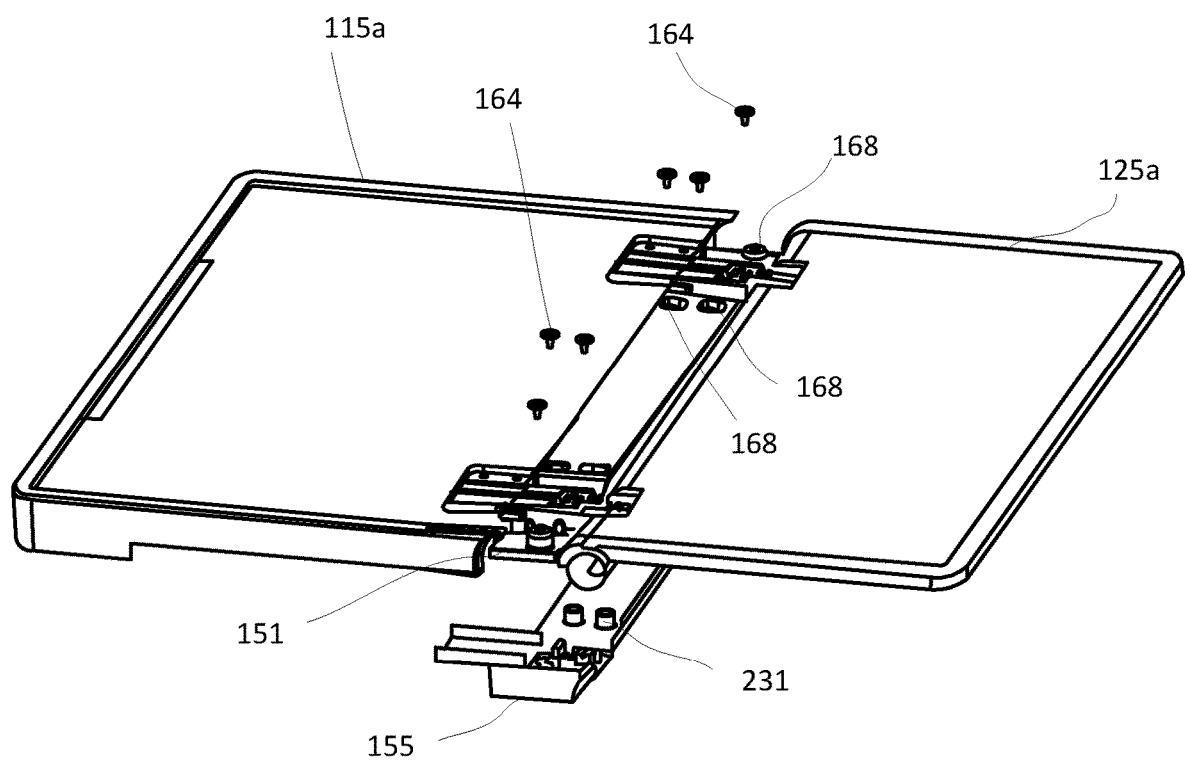

Referring to FIG. 6N, the slider 151 may be covered with a slider cover 155 to enclose and protect the components (e.g., gears) inside thereof. In some implementations, the slider cover 155 may include a plurality of screw bosses 231 and align with holes 168 in the slider 151. In some implementations, the slider cover 155 may be attached to the slider 151 via fasteners 164, such as, screws. Other fasteners, including but not limited to, nut and bolt, claps, clips, staples, glue, adhesive, etc. may be employed to attach the slider cover 155 to the slider 151. In some implementations, the slider cover 155 may be formed from a plastic material and/or other polymeric material.

Figure 6O:
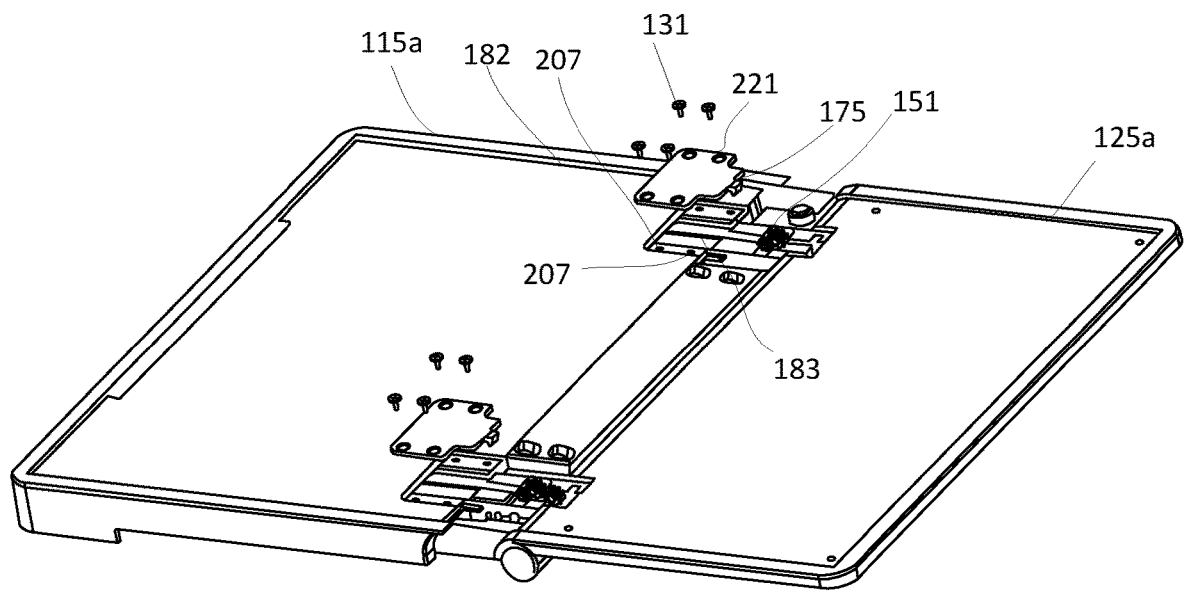
Figure 6P:
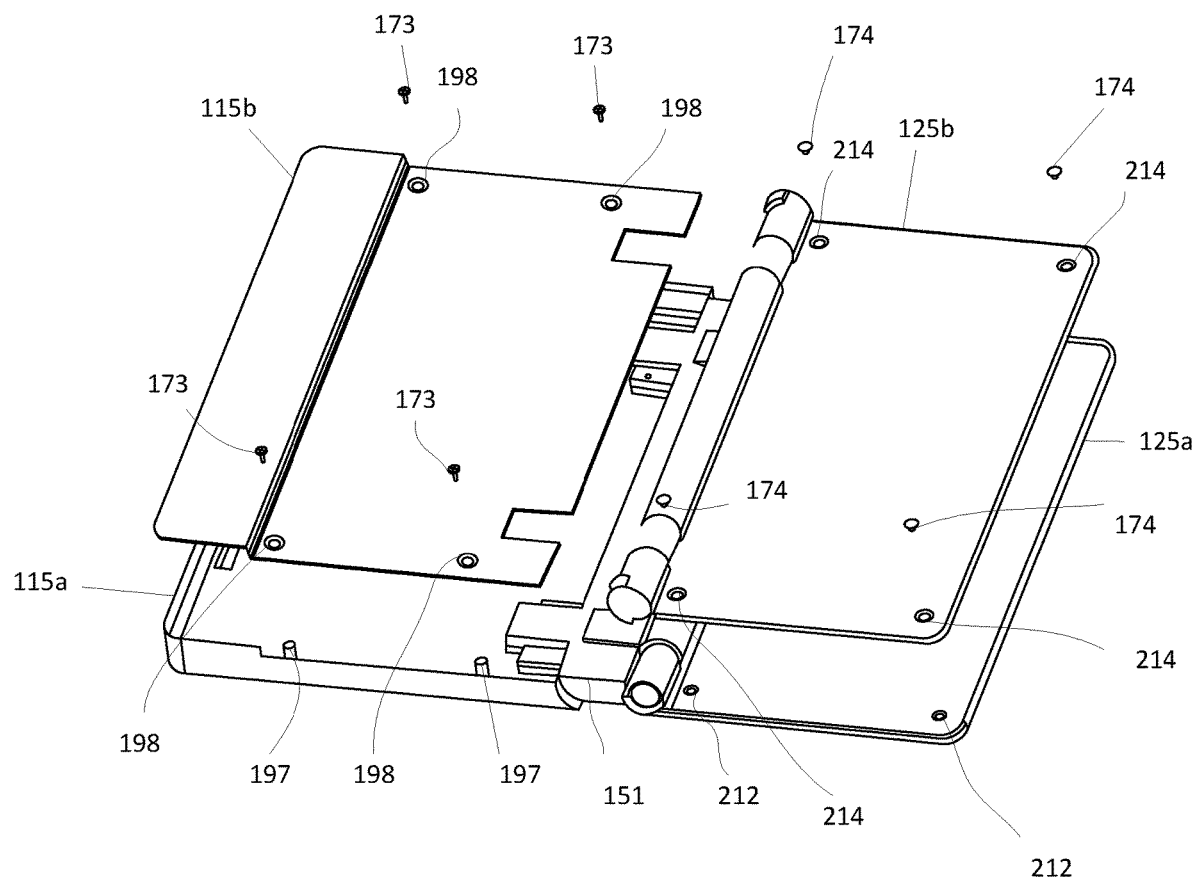

FIGS. 6A through 6P illustrate schematic views of assembling an exemplary display device 10 according to an example embodiment. As shown in FIG. 6A, the set of gears 60 may be initially assembled and mounted to the slider 151. As shown by arrow D1, the first gear 60A and the second gear 60B may be inserted into the slider 151 from a top side of the slider 151. As shown by arrow D2, the third gear 60C, the fourth gear 60D, the fifth gear 60E, the sixth gear 60F, and the seventh gear 60G may be inserted into the slider 151 from a bottom side of the slider 151. In some implementations, the set of gears 60 may be mounted via respective shafts to the slider 151. For example, the shaft 62A of the first gear 60A may be mounted in an opening 64A of the slider 151, a shaft 62B of the second gear 60B may be mounted in an opening 64B of the slider 151, a shaft 62E of the fifth gear 60E may be mounted in an opening 64C of the slider 151, and a shaft 62G of the fifth gear 60E may be mounted in an opening 64D of the slider 151.

Referring to FIGS. 6B and 6C (as view from a bottom of the slider 151), once the first gear 60A and the second gear 60B are mounted in the gear housing 190 of the slider 151, the shaft 62A of the first gear 60A can be inserted into the opening 64A of the slider 151. In the exemplary implementation, the shaft 62A of the first gear 60A can then be moved toward the opening 64A, in which a portion of the shaft 62A can extend out of the opening 64A, as shown in FIG. 6C.

Referring to FIGS. 6D and 6E (as view from a top of the slider 151), the third gear 60C, the fourth gear 60D, the fifth gear 60E, the sixth gear 60F, and the seventh gear 60G can be inserted in the opening 155 of the slider 151. Once the third gear 60C, the fourth gear 60D, the fifth gear 60E, the sixth gear 60F, and the seventh gear 60G are mounted in the opening 155, the shaft 62E of the fifth gear 60E can be inserted into the opening 64C of the slider 151 and the shaft 62F of the sixth gear 60F can be inserted into the opening 64D of the slider 151. In this exemplary implementation, as shown in FIG. 6E, the third gear 60C can then be moved toward the opening 64E such that the third gear 60C can engage with the second gear 60B.

Next, as shown in FIGS. 6F and 6G, the slider 151 can be coupled to the first housing cover 115a of the first housing 110 in accordance to example embodiments. In some implementations, the slider 151 can be coupled to the first housing cover 115a by inserting the extension member 171 of the slider 151 into the opening 183 formed in the first housing cover 115a. The surface 182 of the first housing cover 115a may include grooves to cooperatively engage with the projection members 177 formed on the extension member 171. FIG. 6G illustrates the slider 151 completely coupled to the first housing cover 115a.

Next, as shown in FIGS. 6H and 6I, the second housing cover 125a can be coupled to the slider 151 in accordance to example embodiments. In some implementations, the slider 151, which is already coupled to the first cover housing 115a, may then be coupled to the second housing cover 125a. More specifically, the gear housing 190 can be coupled to the connection member 188 formed on the first housing cover 125a. In some implementations, the connection member 188 may include the two openings 195a, 195b such that corresponding gear housings 190 of the slider 151 can be inserted into the respective openings 195a, 195b. In some implementations, the connection member 188 may include the slot 189 near each of the openings 195a, 195b, so that the slot 189 may cooperatively receive the shaft 62A of gear 60A disposed in the gear housing 190 (shown in FIG. 6K). That is, the shaft 62 of gear 60A may slide into the slot 189 and may affix the gear 60A to the tubular connection member 188 of the first housing cover 125a of the second housing 120.

Referring to FIGS. 6L and 6M, the free-stop hinge device 163 can be installed in the first housing cover 125a of the second housing 120. In some implementations, the free-stop hinge device 163 can be installed in the connection member 188 formed on the first housing cover 125a. In order to ensure that the free-stop hinge device 163 is in a proper position (e.g., aligned) for insertion, the first housing cover 125a of the second housing 120 should be rotated 90 degrees. Then align the rib 196 inside of the connection member 188 with the slot 166 formed on the free-stop hinge device 163 and insert into the connection member 188. At this stage, the free-stop hinge device 163 should be secured inside of the connection member 188. After insertion of the free-stop hinge device 163, the first housing cover 125a is rotated back to 180 degrees.

Referring to FIG. 6N, the slider cover 155 can then be installed (e.g., mounted, attached, coupled, etc.) to the slider 151. In some implementations, the slider cover 155 may include the screw bosses 231 formed on an inner surface of the slider cover 155. The screw boss 231 may be aligned with the holes 168 of the slider 151, so that the slider cover 155 can be fastened to the slider 151 using fasteners 164. In the exemplary implementation, there may be three holes 168 corresponding to three screw bosses 231. Other number of holes and screw bosses, more or less than three, may be employed.

Referring to FIG. 6O, the gear rack 175 may be installed (e.g., mounted, attached, coupled, etc.) to the slider 151. In some implementations, the gear rack 175 may include holes 221 that may align with holes 207 on the surface 182 (near opening 183) of the first housing cover 115a. The holes 221 of the gear rack 175 and the holes 207 of the first housing cover 115a can be fastened using fasteners 131. In the exemplary implementation, there may be four holes 207 corresponding to four holes 221. Other number of holes, more or less than four holes, may be employed.

Referring to FIG. 6P, the second housing cover 115b of the first housing 110 and the second housing cover 125b of the second housing 120 can be installed to the first housing cover 115a and the first housing cover 125a, respectively. In some implementations, the first housing cover 115a of the first housing 110 may be coupled to the second housing cover 115b of the first housing 110 using fasteners 173. The first housing cover 125a of the second housing 120 may be coupled to the second housing cover 125b of the second housing 120 using fasteners 174. In some implementations, the first cover housing 115a may include screw bosses 197 formed on an inner surface of the first cover housing 115a. The screw boss 197 may be aligned with holes 198 formed on the second cover housing 115b of the first housing 110. In the exemplary implementation, there may be four holes 198 corresponding to four screw bosses 197. Other number of holes and screw bosses, more or less than four, may be employed.

In some implementations, the first housing cover 125a may include holes 212 that may align with holes 214 of the second housing cover 125b. In the exemplary implementation, there may be four holes 214 corresponding to four holes 212. Other number of holes, more or less than four holes, may be employed.

In some implementations, the fasteners 174 of the second housing 120 may be shorter than the fasteners 173 of the first housing 110 due to the screw bosses 197 formed on the first housing cover 115a.

In some implementations, the holes 198, 212, 214 may be a counterbore hole to receive the fasteners 173 and 174.

FIG. 7 shows an example of a generic computer device 600, which may be used with the techniques described here. Features described with respect to the computer device 600 may be included in the electronic device 10 described above.

Computing device 600 is intended to represent various forms of digital computers, such as, laptops, workstations, personal digital assistants, servers, blade servers, mainframes, and other appropriate computers. Electronic device 650 is intended to represent various forms of mobile devices, such as personal digital assistants, cellular telephones, smart phones, and other similar electronic devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the electronic device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the electronic device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from electronic device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the electronic device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the electronic device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

The computing device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

In some implementations, the array of display pixels may be formed from liquid crystal display (LCD) components, an array of electrophoretic display pixels, an array of plasma display pixels, microelectromechanical (MEMS) shutter pixels, electro-wetting pixels, micro-light-emitting diodes (small crystalline semiconductor die), quantum dot light-emitting diodes, or display pixels based on other display technologies.

In some implementations, a display pixel may include a light-emitting element (not shown), for instance, an organic light-emitting diode (OLED), and pixel circuit. Each display pixel in the display area may be associated with a pixel circuit, which may include at least one switching thin-film transistor (TFT) and at least one driving TFT on the display. Further, each pixel circuit may be electrically connected to a gate line and a data line to communicate with one or more driving circuits, such as a gate driver and a data driver positioned in the non-display area of the display. For example, one or more driving circuits can be implemented with TFTs in the non-display area 101*b*. There may be any suitable number of rows and columns of pixels in the display (e.g., tens or more, hundreds or more, or thousands or more).

Specific structural and functional details disclosed herein are merely representative for purposes of describing example embodiments. Example embodiments, however, may be embodied in many alternate forms and should not be construed as limited to only the embodiments set forth herein.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein may be interpreted accordingly.

Example embodiments of the present inventive concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the present inventive concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example embodiments.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present embodiments.

Unless otherwise defined, all terms (including technical and scientific terms) used herein have the same meaning as commonly understood by one of ordinary skill in the art to which this present inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A foldable electronic device, comprising:
   a processor;
   a memory;
   a first housing having a first end portion and a second end portion, a first length extending between the first end portion and the second end portion of the first housing;
   a second housing having a first end portion and a second end portion, a second length extending between the first end portion and the second end portion of the second housing, the second length being different than the first length;
   a flexible display disposed on the first housing and the second housing; and
   a hinge assembly coupled to the first housing and the second housing for relative rotation of the first housing and the second housing, the hinge assembly including a slider and a set of gears disposed within the slider, wherein the first end portion of the first housing is distal to the hinge assembly and the second end portion of the first housing is proximate to the hinge assembly, wherein the first end portion of the second housing is proximate to the hinge assembly and the second end portion of the second housing is proximate to the hinge assembly, and wherein the slider is configured to:
   upon the relative rotation occurring in a first direction, move translationally with respect to the second housing and cause the first housing to translationally move in a first linear direction away from the second housing and to cause a distance between the second end portion of the first housing and the first end portion of the second housing to increase, and
   upon the relative rotation occurring in a second direction, move translationally with respect to the second housing and cause the first housing to translationally move in a second linear direction toward the second housing and to cause the distance to decrease, the second linear direction being opposite to the first linear direction.

2. The electronic device of claim 1, wherein the first length is longer than the second length.

3. The electronic device of claim 1, wherein the hinge assembly is configured to rotate the second housing towards the first housing.

4. The electronic device of claim 1, wherein the first housing has a first thickness and the second housing has a second thickness, the first thickness of the first housing being larger than the second thickness of the second housing.

5. The electronic device of claim 1, wherein the first end portion of the first housing has a first thickness and the second end portion of the first housing has a second thickness, the second thickness being different than the first thickness.

6. The electronic device of claim 5, wherein the second housing has a third thickness,
   wherein a combined thickness of the second thickness of the first housing and the third thickness of the second housing has a same thickness as the first thickness of the first housing.

7. The electronic device of claim 1, wherein the hinge assembly further comprises a gear rack, the gear rack including a plurality of teeth to cooperatively engage with at least one of the set of gears.

8. The electronic device of claim 7, wherein the gear rack is coupled to a surface of the first housing.

9. The electronic device of claim 1, further comprising a free-stop hinge in a gear housing, the free-stop hinge being connected to a portion of the set of gears.

10. The electronic device of claim 1, further comprising a flexible display, wherein the flexible display is coupled to the first housing and the second housing.

11. A foldable display device, comprising:
    a processor;
    a memory;
    a first housing having a first end portion and a second end portion;
    a second housing having a first end portion and a second end portion;
    a flexible display disposed on the first housing and the second housing; and
    a hinge assembly coupled to the first housing and the second housing, wherein the first end portion of the first housing is distal to the hinge assembly and the second end portion of the first housing is proximate to the hinge assembly, wherein the first end portion of the second housing is proximate to the hinge assembly and the second end portion of the second housing is proximate to the hinge assembly, the hinge assembly including a slider, a first set of gears and a second set of gears, the first set of gears being disposed in the slider and one of the second set of gears being disposed in the second housing such that when the second housing rotates with respect to the hinge assembly, the slider moves translationally in a linear direction with respect to the second set of gears between a first position and a second position and causes the first housing to move translationally in the linear direction, wherein:
    in the first position of the slider, the second end portion of the first housing and the first end portion of the second housing are separated by a first distance, and
    in the second position of the slider, the second end portion of the first housing and the first end portion of the second housing are separated by a second distance, the second distance being greater than the first distance.

12. The foldable display device of claim 11, wherein the first position corresponds to the display device being in a folded position.

13. The foldable display device of claim 11, wherein the second position corresponds to the display device being in an unfolded position.

14. The foldable display device of claim 11, wherein, in the first position, the second end portion of the first housing and the first end portion of the second housing are facing each other.

15. The foldable display device of claim 11, wherein, in the second position, the second end portion of the first housing and the first end portion of the second housing are facing away from each other.

16. The foldable display device of claim 11, wherein the slider further includes an extension member, the extension member being configured to extend into an opening in the first cover housing and move within the opening based on a rotational movement of the third cover housing.

17. The foldable display device of claim 16, wherein the extension member includes at least one projection member to cooperatively engage with at least one groove formed on the first cover housing.

18. The foldable display device of claim 16, wherein the slider includes a first side portion and a second side portion, the extension member extending in an orthogonal direction with respect to one of the first side portion or the second side portion.

19. The foldable display device of claim 16, further comprising a gear housing, the gear housing being disposed on a first side portion or a second side portion of the slider.

20. The foldable display device of claim 16, wherein one of the second set of gears is disposed in the gear housing.

* * * * *